(12) United States Patent
Polizzotto et al.

(10) Patent No.: US 12,720,324 B2
(45) Date of Patent: Aug. 25, 2026

(54) CONFIGURATION MANAGEMENT AND IMPLEMENTATION OF WIRELESS NETWORKS

(71) Applicant: Charter Communications Operating, LLC, St. Louis, MO (US)

(72) Inventors: Noah Y. Polizzotto, Castle Rock, CO (US); Muhib Taiye Oduwaiye, Aurora, CO (US); Arvind Kopparapu, Parker, CO (US); Nsikak E. Obong, Commerce City, CO (US); Pareshkumar Panchal, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 543 days.

(21) Appl. No.: 18/209,778

(22) Filed: Jun. 14, 2023

(65) Prior Publication Data

US 2024/0422569 A1 Dec. 19, 2024

(51) Int. Cl.

*H04W 16/18* (2009.01)
*G06V 20/50* (2022.01)
*H04W 64/00* (2009.01)

(52) U.S. Cl.

CPC ............ *H04W 16/18* (2013.01); *G06V 20/50* (2022.01); *H04W 64/003* (2013.01)

(58) Field of Classification Search

CPC ... H04W 16/18; H04W 64/003; H04W 4/029; H04W 4/02; H04W 16/02; H04W 84/042;

(Continued)

(56) References Cited

U.S. PATENT DOCUMENTS 8,929,931 B1 1/2015 Goldberg et al.
9,008,670 B2 4/2015 Goldberg et al.

(Continued)

OTHER PUBLICATIONS

Geocam, "It's really simple, view imagery with ArcGIS Web Maps", publication date unknown, pp. 1-3, www.geocam.xyz/product.

(Continued)

*Primary Examiner* — Nimesh Patel
(74) *Attorney, Agent, or Firm* — Armis IP Law, LLC

(57) ABSTRACT

A location analyzer resource (a.k.a., communication management resource) receives location information indicating expected locations of one or more installed physical assets in a network environment. The location analyzer resource also retrieves network infrastructure map information such as including images associated with the network environment. The network infrastructure map information and corresponding images indicate actual locations of available physical infrastructure in the network environment. Among other operations, the location analyzer resource analyzes images of the available physical infrastructure to determine a respective actual location of each installed physical asset of interest. The learned locations of the one or more installed physical assets are then used by a configuration management resource to produce a network installation plan in which to install one or more wireless access points to provide wireless access to wireless stations in respective geographical regions serviced by the new wireless access points.

37 Claims, 12 Drawing Sheets

(58) Field of Classification Search
CPC ..... H04W 12/63; H04W 12/64; H04W 16/24; H04W 4/025; H04W 4/023; H04W 4/38; H04W 4/44; H04W 24/00; H04W 64/00; H04W 12/12; G06V 20/50; G06V 10/82; G06V 30/16; G06V 20/52; G06V 40/172; G06V 10/764; G06V 20/10; G06V 20/182; G06V 20/40; G06V 20/63; G06V 20/58; G06V 2201/07; G06V 20/56; G06V 20/64; G06V 40/197; G06V 20/17; Y02D 30/70; Y02D 10/00; H04B 7/14; H04B 2203/5441; H04B 2203/5445; H04B 7/1858; G06N 20/00; G06N 3/045; G06N 3/09; G06N 3/0495; G06N 3/08; G06N 3/096; G06N 5/022; G06N 3/042; G06N 3/0464; G06N 3/04; G06N 3/091; G06N 5/04; G06N 5/02; G06T 17/05; G06T 19/00; G06T 15/00; G06T 17/00; G06T 7/40; G06T 2207/10016; G06T 2207/30252; G06T 2207/30184; G06T 2207/20084; G06T 2207/30248; G06T 2207/30261; G06T 2207/20081; G06T 2207/10021; G06T 2219/028; G06T 7/70; G06T 7/97

See application file for complete search history.

(56) References Cited

U.S. PATENT DOCUMENTS

| | | | | |
|---|---|---|---|---|
| 10,728,709 | B1 * | 7/2020 | Catalena | H04W 48/08 |
| 2014/0051451 | A1 * | 2/2014 | Goldberg | H04W 16/24<br>455/446 |
| 2015/0312774 | A1 * | 10/2015 | Lau | G05D 1/0274<br>455/446 |
| 2017/0230813 | A1 * | 8/2017 | Geller | H04W 8/005 |
| 2018/0121576 | A1 * | 5/2018 | Mosher | G06N 20/00 |
| 2018/0211441 | A1 | 7/2018 | Priest et al. | |
| 2023/0292139 | A1 * | 9/2023 | Srivastava | H04W 72/56 |

OTHER PUBLICATIONS

Geocam, “Street-level imagery and map data, faster than ever.”, publication date unknown, pp. 1-11, https://www.geocam.xyz.

Geocam, Contact Page, “Let’s start mapping”, publication date unknown, pp. 1-2, https://www.geocam.xyz/contact.

Geocam, Gis Day Expo—GeoCam, publication date unknown, pp. 1-3, https://experience.arcgis.com/experience/f8e6813baeaf46698a1a15b4d59c9bb0/.

* cited by examiner

PROPOSED
WIRELESS NETWORK
INSTALLATION PLAN
150

CONFIGURATION MANAGEMENT AND IMPLEMENTATION OF WIRELESS NETWORKS

BACKGROUND

Conventional wireless technology has been used for many years to connect wireless devices such as phones, laptops, etc., to a landline network and other wireless networks. Today, such wireless networks support many different types of connection services such as voice communications, cell communications, high-speed data services, Wi-Fi™ connectivity, and so on.

Cellular networks typically include a land area that has been divided into so-called cellular regions. A single base station typically resides in each cell. Often, the base station is connected to a landline network and supports communication with one or more wireless subscribers operating in a region covered by the cell. Accordingly, a wireless subscriber operating a cell phone in the cell is able to communicate with or have access to a landline network via a wireless link between the subscriber and a base station.

Conventional long-range cellular networks sometimes do not have the ability to provide connectivity to users at every location in a geographical region. One reason for this shortcoming is the high cost associated with designing and subsequently implementing a long-range cell tower for every portion of a geographical region. In many instances, a cell tower providing long-range coverage requires a long-term financial commitment. In certain instances, because costs are so high, a service provider may not even install a cell tower because it is not a good investment.

More recent wireless technology includes so-called pico base stations or Wi-Fi™ stations having the ability to provide short-range coverage compared to long-range coverage provided by conventional cell towers. Typically, the short-range base stations have the ability to provide coverage in locations that were not previously possible. As an example, a pico base station may provide radial coverage on the order of 200-300 meters. A long-range base station or conventional cell tower may provide wireless coverage on the order of a mile or more.

Because of cost concerns and higher re-usage of frequencies in the RF spectrum, it is now becoming more common to implement one or more pico base stations to provide additional wireless coverage in a region. Small cell base station deployment may increase the number of cells in a given area, and thereby, improve the overall network capacity without adding more RF spectrums. In certain cases, a short-range base station can be mounted to existing infrastructure (e.g., a cable), alleviating the costs associated with having to design and erect a dedicated tower.

BRIEF DESCRIPTION OF EMBODIMENTS

Techniques herein provide improved design and installation of wireless access networks, providing expanded use of limited wireless bandwidth in a network environment.

More specifically, a communication (configuration) management resource receives location information associated with a physical asset installed in a network environment. The physical asset supports installation of a wireless access point. The configuration management resource retrieves images associated with the network environment. The images, such as determined form street view images, indicate locations of available physical infrastructure for installation of a respective wireless access point. The configuration management resource analyzes images of the available physical infrastructure to determine an actual location of the installed physical asset with respect to the original location information (and expected location) associated with the physical asset in the network environment. The configuration management resource then uses the determined actual location of the installed physical asset, rather than the original location information and expected location of the installed physical asset, as a basis to install a new wireless access point.

In accordance with further examples as discussed herein, the configuration management resource (a.k.a., location analyzer resource) can be configured to detect that the installed physical asset does or does not reside at an expected location as indicated by the originally received location information. In such an instance, via image analysis, the configuration management resource identifies an object in the images that resides within a threshold distance of the expected location of the installed physical asset of interest. Assume in this example that the configuration management resource determines from the analysis of images (such as based on shape and size of the object in street view images) that the object in the images is the installed physical asset of interest. The configuration management resource then produces a location value indicating the actual location of the object in the images and sets the actual location of the installed physical asset of interest to the determined actual location based on the identified object in the images.

The configuration management resource can be configured to determine the actual location of the physical asset in any suitable manner. For example, the configuration management resource can be configured to receive a visual depiction representing an appearance of the physical asset of interest. The original received location information associated with the installed physical asset indicates an approximate location where the physical asset of interest was believed to be installed in the network environment. The configuration management resource matches the visual depiction representing the appearance of the installed physical asset of interest to an object in the images of the available physical infrastructure. The configuration management resource determines the actual location of the installed physical asset of interest (such as a wireless access point, telephone pole, or other suitable entity) based on a location of the visual depiction as determined from the analyzed one or more images.

Yet further, the communication/configuration management resource as discussed herein can be configured to determine presence of different types of resources (such as installed physical assets) in a vicinity of a location as specified by the location information. For example, as previously discussed, the configuration management resource can be configured to determine the actual location of an installed physical asset of interest (such as a wireless access point, telephone pole, or other suitable entity) based on a location of the visual depiction as determined from the analyzed one or more images. Still further, based on object recognition of objects nearby the visual depiction of the installed physical asset of interest, the communication management resource analyzes, detects, and determines locations of other objects (such as amplifiers, splice cases, poles, aerial strands, etc.) in the images nearby the installed physical asset of interest. In such an instance, via image analysis and object recognition, the communication management resource can be configured to determine a type of each installed physical asset via analysis of the images. In accordance with more specific examples, via further analysis of the images, the communication management resource: i) detects presence of a first aerial strand (such as cable) and a second aerial strand (such as cable) in a vicinity of a location as specified by the location information, and ii) determines a distance between the first aerial strand and the second aerial strand. Based on the learned information of available types of installed physical assets and their respective locations, the communication management resource as discussed herein can be configured to propose installation of a wireless access point or other suitable entity between the first aerial strand and the second aerial strand in response to detecting that the distance between the first aerial strand and the second aerial strand is sufficiently large to install the wireless access point. Thus, knowledge of the locations of the different installed physical assets as determined by the images is useful to determine where to install a new wireless access point.

Note further that the installed physical asset can be any suitable entity (pole, strand, wireless access point, etc.). In one example as discussed herein, the physical asset is an installed wireless access point. In response to input indicating that the installed wireless access point does not provide desired wireless coverage to a corresponding one or more subscriber domains in the network environment, the configuration management resource can be configured to produce a proposed wireless network installation plan for installing a new wireless access point in the network environment as a replacement to the installed wireless access point. The configuration management resource can be configured to generate the proposed wireless network installation plan based on the actual determined locations of available physical infrastructure and a corresponding target location of the one or more subscriber domains to be serviced by the new wireless access point.

Note further that the proposed wireless network plan as discussed herein can be configured to indicate multiple candidate locations in a vicinity of the determined actual location of a previously installed wireless access point (such as an installed physical asset) that fails to provide desired wireless coverage to a corresponding subscriber domain. For example, assume that the multiple candidate locations in which to potentially install a new wireless access point may include a first candidate location and a second candidate location. The configuration management resource or other suitable entity such as an installation technician as discussed herein can be configured to initiate transmission of a first wireless signal from a wireless device (such as operated by installation personnel) at the first candidate location and receive first feedback indicating first performance of a wireless station in the target subscriber domain receiving the first wireless signal. The configuration management resource were other suitable entity such as an installation technician can be configured to initiate transmission of a second wireless signal from the wireless device at a second candidate location and receive second feedback indicating second performance of the wireless station in the target subscriber domain receiving the second wireless signal. The configuration management resource or installation technician then chooses to install the new wireless access point at the second candidate location instead of the first candidate location in response to detecting that the second performance (such as higher signal strength) is greater than the first performance.

In accordance with still further examples, assume that the images of available physical assets include at least a first image and a second image. The first image captures a first angular view of the installed physical asset; the second image captures a second angular view of the installed physical asset. As previously discussed, the configuration management resource analyzes images of the available physical infrastructure to determine the actual location of the installed physical asset. For example, the configuration management resource as discussed herein can be configured to determine the actual location of the installed physical asset of interest based on a combination of the first image and the second image. The actual location information generated for the installed physical asset of interest as determined from the images specifies one or more parameters such as a height, latitude, and longitude of the installed physical asset in the network environment.

In a yet further example, based on determined actual locations of one or more installed physical assets (such as the original installed physical asset of interest and zero or more other installed physical asset in a vicinity of the original installed physical asset) in the network environment, the configuration management resource produces a proposed wireless network plan indicating multiple candidate locations (such as a first candidate location and a second candidate location and so on) in a vicinity of the actual locations of the installed physical assets.

Note that the configuration management resource or other suitable entity can be configured to rank the first candidate location and the second candidate location depending on a density of first mobile communication device users at the first candidate location and a density of second mobile communication device users at the second candidate location.

As previously discussed, the installed physical asset as discussed herein can be an installed wireless access point that is incapable of providing desired wireless coverage. The configuration management resource can be configured to produce a proposed wireless network installation plan for installing a new wireless access point in the network environment as a replacement to (or in addition to) the installed wireless access point based on the locations of available physical infrastructure and corresponding target location of a subscriber domain to be serviced by the new wireless access point.

Note further that the configuration management resource or other suitable entity as discussed herein can be configured to, prior to installation of a new wireless access point in the network environment, perform a test simulation to confirm that a proposed location of the new wireless access point with respect to the determined actual locations of one or more installed physical assets provides a desired wireless coverage in a geographical region. The configuration management resource or installation technician initiates installing of the new wireless access point in the network environment at the proposed location. The configuration management resource or other suitable entity then initiates transmission of wireless signals from the installed new wireless access point to a wireless station (such as so-called user equipment) in the geographical region.

In accordance with still further examples, the configuration management resource can be configured to produce a proposed wireless network installation plan for installing a new wireless access point in the network environment based on the availability of one or more installed physical assets and a corresponding determine actual locations. The proposed wireless network installation plan can include one or more images illustrating how or where to install one or more new wireless access points. For example, the configuration management resource can be configured to generate the proposed wireless network installation plan to include a first image of the images. The configuration management resource can be configured to produce the first image to include a rendition of the installed physical asset as determined from street view images. The configuration management resource further can be configured to mark the first image (such as derived from street view images) to indicate a corresponding location in which to install the new wireless access point with respect to the rendition of the installed physical asset in the first image. In such an instance, respective installation personnel use the first image and corresponding mark to determine an actual location in which to install the new wireless access point in the network environment.

Thus, use of the images (such as including street view images) associated with available physical assets in a respective network environment provide guidance as to what physical assets are available for installation of corresponding one or more new wireless access points.

In accordance with further example embodiments, the system as discussed herein can be configured to determine a type (such as pole, strand, amplifier, wireless access point, etc.) of one or more the installed physical asset via analysis of the images.

Yet further embodiments of the system as discussed herein include, via analysis of the images: i) detecting presence of a first aerial strand and a second aerial strand in a vicinity of a location as specified by the location information, and ii) determining a distance between the first aerial strand and the second aerial strand. The system can be configured to propose installation of a wireless access point between the first aerial strand and the second aerial strand in response to detecting that the distance between the first aerial strand and the second aerial strand is sufficiently large or wide to install the wireless access point.

Examples as discussed herein are useful over conventional techniques. For example, implementation of a configuration management resource and corresponding operations as discussed herein provides expeditious installation of wireless networks and improved wireless coverage to provide wireless connectivity to different users.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: receive location information associated with a physical asset installed in a network environment; retrieve images associated with the network environment, the images indicating locations of available physical infrastructure; analyze images of the available physical infrastructure to determine an actual location of the installed physical asset; based on the determined actual location of the installed physical asset, produce a proposed wireless network plan indicating a candidate location with respect to the actual location of the installed physical asset to install a new wireless access; prior to installation of the new wireless access point in the network environment, perform a test simulation to confirm that a proposed location of the new wireless access point with respect to the installed physical asset provides a desired wireless coverage in a geographical region; install the new wireless access point in the network environment; and transmit wireless signals from the installed new wireless access point to a wireless station in the geographical region.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved wireless connectivity in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
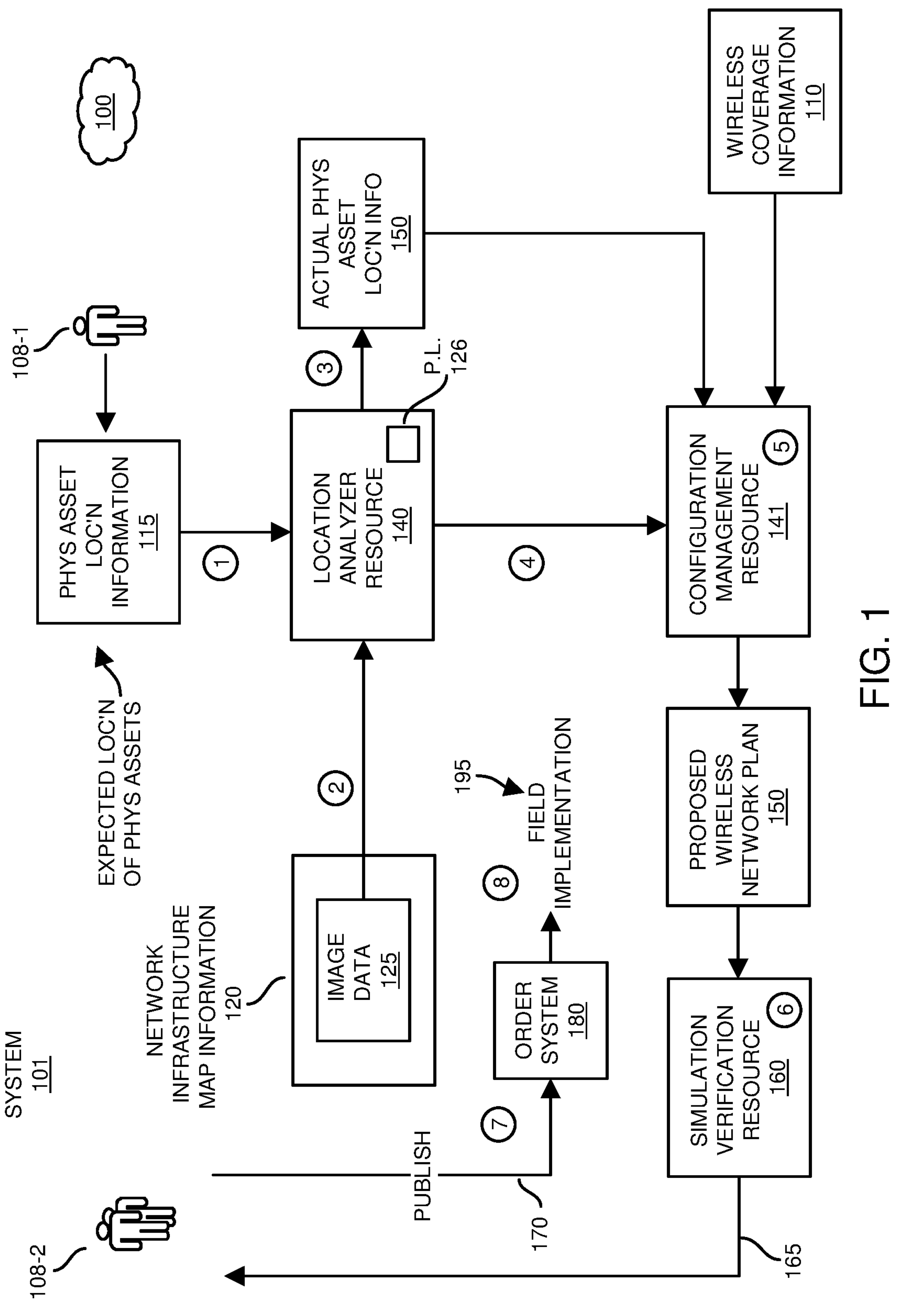
FIG. 1 is an example diagram illustrating implementation of a configuration management resource and related components to facilitate installation of one or more new wireless access points in the network environment as discussed herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

Human generated information indicating the spatial locations of different installed physical assets (such as poles as well as the height of these poles) and a respective network environment have proven to be very inaccurate. Use of inaccurate locations of different installed physical assets results in wireless network installations that operate poorly.

A tool as discussed herein provides a way to crawl through street view level imagery (such as street view images) to collect, identify, and measure characteristics and attributes of utility poles and macro candidates for the deployment of a respective wireless network (such as one or more wireless access points). The tool can be configured to uses machine learning, deep learning, and artificial intelligence, leveraging a large amount of professional grade GPUs to analyze many images to produce data indicating actual locations of different physical assets installed in a network environment.

In one example, a network configuration management resource or other suitable entity receives location information associated with a physical asset of interest installed in a network environment. The configuration management resource retrieves network infrastructure map information (such as including one or more images) associated with the network environment. The network infrastructure map information pictorially indicates locations of available physical infrastructure. The configuration management resource analyzes images (such as street view images) of the available physical infrastructure to determine an actual location of the installed one or more physical assets of interest. Based on the determined actual location of the one or more installed physical assets of interest, the configuration management resource produces a proposed wireless network plan indicating a candidate location with respect to the actual location of the installed physical assets of interest to install a new wireless access.

Prior to installation of the new wireless access point in the network environment, the configuration management resource or other suitable entity can be configured to perform a test simulation to confirm that a proposed location of the new wireless access point with respect to the original installed physical asset of interest provides a desired wireless coverage in a geographical region. The configuration management resource then initiates installation of the new wireless access point in the network environment. Eventually, after installation, the newly installed wireless access point transmits wireless signals to a wireless station (such as user equipment) in the geographical region to provide the wireless station (and potentially other wireless stations in the subscriber domain) access to a remote network through the newly installed wireless access point.

Now, more specifically, FIG. 1 is an example diagram illustrating implementation of an analyzer and configuration management system as discussed herein.

In this example, the communication system 101 includes physical asset location information 115, network infrastructure map information 120, location analyzer resource 140, actual physical asset allocation information 150, wireless coverage information 110 indicating a desired wireless coverage, configuration management resource 141, proposed wireless network plan 150, simulation verification resource 160, and order system 180.

Note that each of the resources in the system 101 and network environment 100 can be configured as hardware, software, or a combination of hardware and software. For example, the location analyzer resource 140 can be configured as location analyzer hardware, location analyzer software, or a combination of location analyzer hardware and location analyzer software; configuration management resource 141 can be implemented as configuration management hardware, configuration management software, or a combination of configuration management hardware and configuration management software; simulation verification resource 160 can be configured as simulation verification hardware, simulation verification software, or a combination of simulation verification hardware and simulation verification software; and so on.

Note that each of the resources such as the location analyzer resource 140, simulation verification resource 160, order system 180, etc., can be considered a configuration management resource or configuration management function as described herein.

Initially, in this example, assume that the personnel 108-1 or other suitable entity produces respective physical asset location information 115 (such as records) indicating respective locations where one or more physical assets are believed to be installed in a respective network environment. The physical assets in network environment 100 can be any type of entity such as a (telephone) pole, wireless access point, physical strand of cable or wire, etc.

As previously discussed, the physical asset location information 115 can be configured to indicate approximate or expected locations of the different physical assets associated with the network environment as discussed herein.

In this example, in operation #1, the location analyzer resource 140 executed by the processing logic 126 or other suitable entity retrieves or receives the physical asset location information 115. The physical asset location information 115 specifies an approximate location of the one or more particular physical assets of interest.

The personnel 108-1 or other suitable entity specifies one or more particular physical assets of interest for analysis by the location analyzer resource 140.

In general, the location analyzer resource 140 performs appropriate image processing to determine an actual location of each of the different physical assets of interest. Knowing the precise location of each of the different physical assets of interest rather than merely the approximate locations of those different physical assets as determined by the location analyzer resource 140 ensures that subsequent use of location information associated with the one or more installed physical assets supports a wireless network plan the corresponding desired wireless coverage. In other words, as previously discussed, it is desirable to know and verify the location of one or more installed physical assets in a respective network environment 100 prior to creating a respective proposed wireless network plan including installation of one or more new wireless access points to provide desired wireless coverage to one or more geographical regions in the network environment 100.

In operation #2, the location analyzer resource 140 accesses the network infrastructure map information 120 such as including image data 125 to determine an actual location of each particular physical asset of interest installed in the network environment 100. As further discussed herein, the image data 125 may include street view images obtained via implementation of a respective image capturing device. As previously discussed, it is desirable to know the precise location of each of the installed physical assets of interest.

In operation #3, the location analyzer resource 140 produces the actual physical asset location information 150 after verifying physical locations of one or more installed physical assets based on the image data 125. The actual physical asset location information 150 indicates a respective determined actual location of each of the particular physical asset of interest in the network environment 100.

As discussed herein, the actual locations of the different one or more installed physical assets can be determined in any suitable manner such as the analysis of corresponding image data 125. In accordance with one example, the image data 125 includes images (such as street view images or other survey information) of the corresponding installed physical assets at a location as well as where each of those installed physical assets is located in the respective network environment.

Thus, examples herein include, for each of one or more installed physical assets of interest, the location analyzer resource 140: i) receives location information 115 associated with a corresponding physical asset installed in a network environment 100, the location information 115 indicates expected locations of one or more installed physical assets; ii) retrieves network infrastructure map information 120 including image data 125 of street view images associated with the network environment, the images as captured by the image data 125 include visual representations of the corresponding physical asset of interest as well as location of the available physical infrastructure of interest; and iii) analyzes the network infrastructure map information 120 corresponding images (such as image date 125) of the available physical infrastructure to determine an actual location of each installed physical asset of interest.

If desired, the location analyzer resource 140 can be configured to analyze supplemental information such as images (such as image information or image data 125) of the available physical infrastructure to determine corresponding attributes (such as height, wireless signal blocking impediments, surrounding obstacles blocking wireless signals, etc.) of the available physical infrastructure (such as in the x-y axis or side view perspective).

In one embodiment, the images associated with image data 125 (a.k.a., image information) and corresponding available network infrastructure are generated by one or more camera devices that receive optical signals reflected off the different instances of the available physical infrastructure (installed physical assets) in a respective geographical region. The images can be video data, photos, survey information, etc. Alternatively, the images of image information 125 are drawings of the respective physical infrastructure. As further discussed herein, the configuration management resource 141 can be configured to produce a proposed wireless network installation plan 150 for a new wireless network based on the locations and the corresponding attribute information.

In further example embodiments, as further discussed herein, note that analyzing images of the available physical infrastructure in image data 125 includes the location analyzer resource 140 or other suitable entity mapping locations of the available physical infrastructure as indicated by the network infrastructure map information and/or physical asset location information 115 to actual or nearby instances of the available physical infrastructure in the images.

In operation #4, via actual physical asset location information 150 or other communications, the location analyzer resource 140 notifies the configuration management resource 141 of actual locations of the one or more particular physical assets of interest in the network environment (as determined from the image data 125) for possible installation of one or more corresponding new wireless access points. In other words, the location management information 140 verifies the actual locations of the installed physical assets of interest based on image data 125.

In operation #5, the configuration management resource 141 receives desired wireless coverage information 110 indicating one or more geographical regions in which to provide wireless services and corresponding desired wireless coverage to one or more communication devices, subscriber domains, etc., in those regions. Thus, in one example, in addition to receiving notification of actual locations of the physical assets in the network environment 100, the configuration management resource 141 receives wireless coverage information 110 indicating a desired wireless coverage to be provided to one or more wireless stations operated in the network environment 100. Based on the actual locations of the installed physical assets in the network environment 100 as specified by the information 150 and the desired wireless coverage information 110, the communication management resource 141 produces a proposed wireless network plan 150 indicating locations in which to install one or more new wireless access points with respect to the locations of the installed physical assets in the network environment 100.

In processing operation #6, as its name suggests, the simulation/verification resource 160 or other suitable entity performs a respective simulation/verification of the proposed wireless network installation plan 150 based on the known actual locations of the installed physical assets or other impediments or obstacles located in the network environment 100. In one example, via the notification 165 associated with processing operation #6, the simulation verification resource 160 notifies the corresponding personnel 108-2 whether simulation of the proposed wireless network installation plan 150 meets a desired performance level to provide one or more wireless stations in the corresponding geographical region access to the remote network.

In operation #7, via command 170, the personnel 108-2 or other suitable entity publishes the proposed wireless network installation plan 150 to order system 180. The proposed wireless network installation plan 150 indicates corresponding one or more installed physical assets to be used as a basis of supporting installation of one or more new wireless access points.

In processing operation #8, via field implementation 195, the one or more technicians or other suitable entities install the one or more wireless access points in a network environment (at respective one or more locations as specified by the plan 150) to deploy the new wireless network and provide the desired wireless services in the geographical regions as specified by the wireless coverage information 110.

Thus, initially, the records (such as physical asset location information 115) associated with physical assets installed in a respective network environment can be verified via network infrastructure map information 120 and corresponding image data 125 to subsequently implement installation of one or more wireless access points to provide wireless coverage to corresponding one or more different geographical regions. The determination of the actual location of the one or more different physical assets installed in the respective network environment ensures that the proposed wireless network plan 150 indicates proper locations where to install one or more new wireless access points.

Accordingly, techniques herein include a database of pole information (such as location information 115), though valuable in some contexts, may be inaccurate with respect to indicating location of installed physical assets in a network environment 100.

The system 101 (such as a so-called Design Asset Validation Platform) can be configured to include a software program and corresponding hardware that uses machine learning and artificial intelligence to traverse and analyze street-view imagery (image data 125) to identify one or more installed physical assets such as utility poles and macro assets for the deployment of small cell radios (such as wireless access points and/or wireless base stations supporting 5G or other suitable wireless communication protocols.

For each installed physical asset of interest, the system 101 and corresponding components can be trained to identify the real world (latitude/longitude) coordinates, the height of the installed physical asset or pole as well as the height of the strand(s) attached to it, as well as identify electronic equipment already present on the pole such as amplifiers, transformers, etc.

Via the location information 115, a list of poles or other installed physical assets is provided to the location analyzer resource 140 (analyzer resource). The location information 115 can be encoded in any suitable manner. In one example, the physical asset location information 115 is encoded in the form of a CSV (comma separated values) document. The physical asset location information 115 can be configured to indicate a unique identifier of the pole, expected location such as latitude and longitude coordinates of the pole, the expected height of the pole, and whether the backhaul running through the pole is only coax or coax with an additional fiber run.

This list of potential site candidates (installed physical assets such as poles and/or aerial strands as specified by the physical asset location information 115) is fed to the location analyzer resource 140 (such as a user operated software program) that ingests the physical asset location information 115 indicating installed physical asset locations. The location analyzer resource 140 uses these input coordinates as areas of interest to download and process corresponding image data such as street view images taken from street-view vehicles or other suitable entity.

In one example, the image data 125 is retrieved from servers using a respective repository using API (application programming interface). As further discussed herein, it may be useful to derive the location of each installed physical asset via use of multiple images of the installed physical asset taken from different perspectives. In other words, the image capturing device produces respective images from multiple different angles and perspectives. The location analyzer resource 140 can be configured to use the respective images from the multiple different angles and perspectives to determine the respective actual location of the one or more physical assets in the network environment 100.

As further discussed herein, if the location analyzer resource 140 is not able to identify a utility pole at the location specified by the physical asset location information 115, the location analyzer resource 140 searches through the image data 125 to determine, based on one or more objects near the identified location, one or more different candidate physical assets that may be the installed physical asset (utility pole) of interest as identified by the physical asset location information 115.

As a further example, the output of the machine learning and artificial intelligence technology implemented by the location analyzer resource 140 can be configured to identify the following characteristics of the utility pole: i) spatial location of the pole or installed physical asset in the form of latitude and longitude coordinates, height of the pole and the strand(s) running from the pole, ii) distance between strands if more than one strand is present on the pole, iii) existence of equipment on or near the strand that would disqualify the pole from being able to be used as a strand mount radio location such as amplifiers, transformers, splice cases, etc., and possible azimuths (angles) of small cell radio attachment.

In accordance with still further examples, the system 101 as described herein can be configured to receive a list of serviceable addresses (such as specified by the physical asset location information 115), which is provided to the communication management resource 141 the form of a CSV document or other suitable format. The physical asset location information 115 can be configured to include a unique identifier of the macro candidate (such as installed physical asset of interest), the expected latitude and longitude coordinates of the macro candidate, the expected height of the macro candidate, address, and type of customer/asset. The system 101 and corresponding location analyzer resource 140 can be configured to collect images (image data 125) of the expected asset from as many angles and perspectives as possible given that most of these installed physical assets of interest are buildings where the macro radio will be mounted on the roof or façade of the building.

Note that the system as discussed herein can be configured to provide guidance on installation of small cell wireless access points and/or wireless base stations as well as macro or large cell wireless access point or wireless base stations. The macro radios can be installed on available physical assets that are suitable for the deployment of long range radios if desired. In such an instance, the installed physical asset of interest may be a cell tower instead of a telephone pole. Accordingly, the utility of the system as discussed herein can be implemented for installation of small cell and large cell deployment.

The output of the location analyzer resource 141 (such as implementing machine learning and artificial intelligence technology) identifies the following one or more characteristics of the installed physical macro asset: spatial location in the form of latitude and longitude coordinates, length, width, and height of the asset/building type, roof type, square footage (area) of possible radio attachment, and possible azimuths (angles) of attachment in respect to the amount of square footage of possible radio attachment.

In accordance with further examples as discussed herein, the system 101 can be configured to prioritize and/or categorize use of the installed physical assets through a set of criteria such that new one or more wireless access points support higher user density areas, major roads, or thoroughfares.

Yet further, note that the location analyzer resource 140 as described herein can be configured to receive location information indicating a location (such as geographical region or subscriber domain) in which to provide wireless services in the network environment 100. The location analyzer resource can be configured to retrieve network infrastructure map information including street view images associated with the network environment 100 at the desired location of providing the wireless services. The street view images indicate locations of available physical infrastructure based on locations of a respective image capturing device obtaining images of the different installed physical assets at the specified location. The location analyzer resource 140 analyzes the street view images of the available physical infrastructure to determine actual locations of installed physical assets in which to potentially install a respective new wireless access point. The configuration management resource 141 then produces a proposed wireless network installation plan for installing one or more new wireless access points in the network environment based on respective actual locations of one or more installed physical assets as determined from the street view images. Thus, the street view images of the different installed physical assets in the network environment 100 can be used to determine actual locations of the respective installed physical assets for generating a respective wireless network plan of installing and implementing one or more new wireless access points to provide the desired wireless services.

Figure 2:
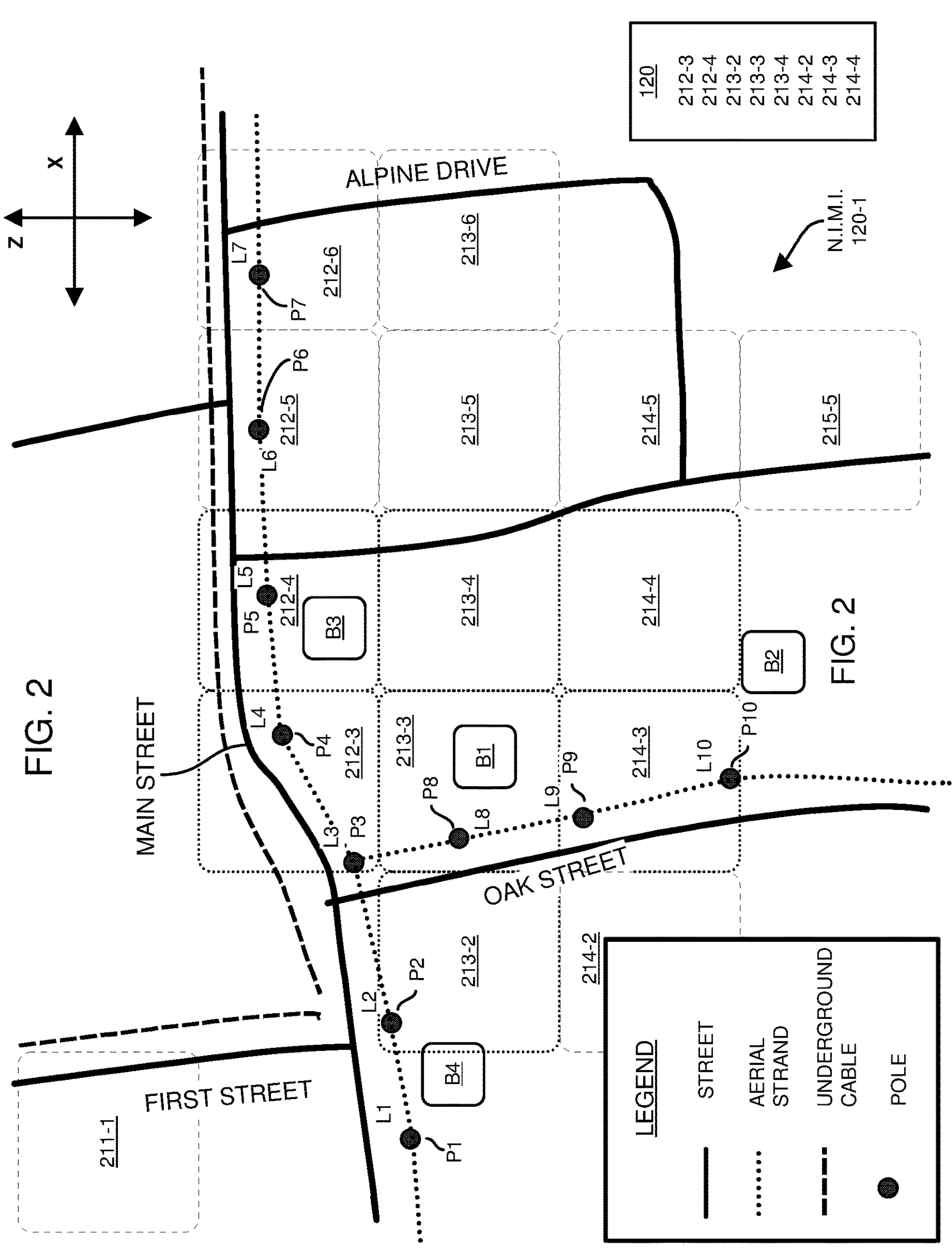
FIG. 2 is an example diagram illustrating network infrastructure map information indicating locations of installed physical assets as discussed herein.

FIG. 2 is an example diagram illustrating network infrastructure mapping information as described herein.

As previously discussed, the network infrastructure map information 120 can be configured to include image data 125 capturing images of the different locations of interest. See FIGS. 4-6 and corresponding description indicating how to collect and use such information.

Note further that the network infrastructure map information 120 can be configured to include any collected map information such as derived from land surveys as well. If land survey information is not available, the captured image data at multiple different geographical locations (including multiple perspective image views from each location) as discussed herein can be used as a basis to determine actual location of an installed physical asset of interest.

Figure 3:
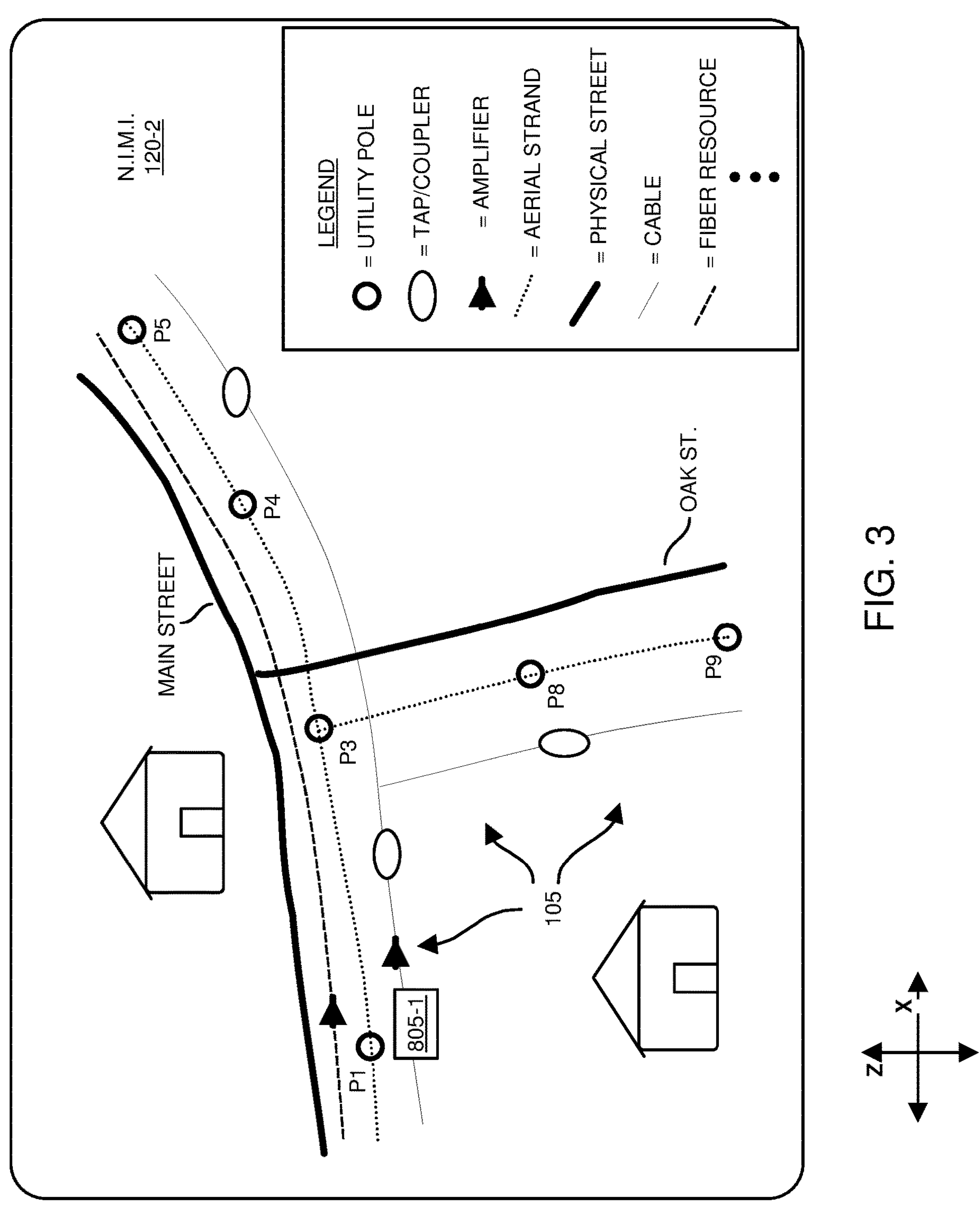
FIG. 3 is an example diagram illustrating network infrastructure map information indicating different types of assets disposed at different locations in a network environment as discussed herein.

Note that the network infrastructure map information 120 is shown in FIGS. 2 and 3 can be generated based on analysis of street view images obtained via a respective image capturing device is further discussed in the period In this example, the network infrastructure map (location) information 120 includes survey information (such as obtained from one or more images as discussed herein, land surveys from land surveyors, etc.) indicating presence of geographical regions in a network environment 100 and corresponding locations of physical infrastructure (i.e., available installed physical assets of interest). The network infrastructure map information 120 and corresponding images can be configured to include aerial photographs (such as from satellites), human or machine generated survey information, etc., indicating actual locations of installed physical assets.

For example, as shown, network infrastructure map information 120-1 (such as top view images) indicates street information as well as subdivisions of regions such as geographical region 211-1, geographical region 212-3, geographical region 212-4, geographical region 212-5, geographical region 212-6, geographical region 213-2, geographical region 213-3, geographical region 213-4, geographical region 213-5, geographical region 213-6, geographical region 214-2, geographical region 214-3, geographical region 214-4, geographical region 214-5, geographical region 215-5, etc.

Note that although the regions associated with the network infrastructure map information 120-1 are subdivided into square partitions in this non-limiting example embodiment, each of the geographical regions can be of any suitable shape such as octagon, circle, etc.

Note that the geographical regions can be selected to be of any suitable size. For example, in one non-limiting example embodiment, each of the geographical regions is of approximately equal size such as around 328 square feet or other suitable value of area (100 meters×100 meters). In most cases, a single base station (wireless access point) installed in a respective geographical region supports full wireless coverage to any mobile device users that happen to be in the geographical region or one or more adjacent or nearby regions.

As previously discussed, techniques herein include the discovery that some of the geographical regions and corresponding physical infrastructure residing in network environment 100 may or may not be good candidates to install a respective new wireless access point.

In addition to subdivided regions, the network infrastructure map information 120-1 can be configured to include a map of network resources (physical infrastructure or installed physical assets such as aerial strands, underground cables, telephone poles, etc.) that are available to facilitate installation of a respective new wireless access point. As its name suggests, the network infrastructure map information 120-1 indicates locations of the different available resources with respect to roads, buildings, etc. Selection of locations for implementing one or more wireless access points depends on multiple factors as further discussed herein.

In this example, assume that the wireless coverage information 110 indicates a desire to provide wireless connectivity/services to one or more of geographical regions 212-3, 212-4, 213-2, 213-3, 213-4, 214-2, 214-3, and 214-4.

Via network infrastructure map information 120-1, the location analyzer resource 140 identifies presence and locations of available physical infrastructure (installed physical assets) such as aerial strands, underground cables, telephone poles, power sources, etc. As further shown, the network infrastructure map information 120-1 can be configured to show undesirable obstacles such as buildings B1, B2, B3, B4, etc., that may affect the ability to provide wireless services in the region as specified by the wireless coverage information 120. Based on the information in the network infrastructure map information 120-1, the location analyzer resource 140 analyzes available resources (installed physical assets) for accurate locations of same.

Further in this example, after appropriate analysis of images, surveys, etc., the network infrastructure map information 120-1 indicates that: telephone pole P1 (installed physical asset) is located at location L1; telephone pole P2 (installed physical asset) is located at location L2; telephone pole P3 (installed physical asset) is located at location L3; telephone pole P4 (installed physical asset) is located at location L4; telephone pole P5 (installed physical asset) is located at location L5; telephone pole P6 (installed physical asset) is located at location L6; telephone pole P7 (installed physical asset) is located at location L7; telephone pole P8 (installed physical asset) is located at location L8; telephone pole P9 (installed physical asset) is located at location L9; telephone pole P10 (installed physical asset) is located at location L10; and so on.

Network infrastructure map information 120-1 in this example further illustrates that: a first aerial strand (installed physical asset such as above ground communication links such as coax, fiber, twisted pair of wires, etc.) extends between the telephone pole P1 and telephone pole P2; a third aerial strand (installed physical asset such as above ground communication links such as coax, fiber, twisted pair of wires, etc.) extends between the telephone pole P3 and telephone pole P4; a fourth aerial strand (installed physical asset such as above ground communication links such as coax, fiber, twisted pair of wires, etc.) extends between the telephone pole P4 and telephone pole P5; a fifth aerial strand (installed physical asset such as above ground communication links such as coax, fiber, twisted pair of wires, etc.) extends between the telephone pole P5 and telephone pole P6; and so on.

Note that each of the aerial strands supports conveyance of the bidirectional communication signals, power signals, etc., supporting connectivity of respective wireless access points.

FIG. 3 is an example diagram illustrating network infrastructure mapping information as described herein.

In this example, symbols (such as associated with physical infrastructure) displayed in the network infrastructure map information 120-2 represent corresponding objects (installed physical assets or physical network infrastructure) located in the geographical region.

As shown, the network infrastructure map information 120-2 captures network environment details associated with network infrastructure such as a physical location of utility poles, aerial resources on which to potentially mount one or more base stations (wireless access points), amplifiers, cables, power source to power the wireless base stations, fiber resources, taps, couplers, underground resource 805-1, etc.

Accordingly, via the details (images) displayed in network infrastructure map information 120-2, the location analyzer resource 140 is able to identify presence and/or locations of the different types of resources (installed physical assets) in a geographical region.

As further discussed herein, the location analyzer resource 140 can be configured to receive physical asset location information 115 indicating, for each installed physical asset of interest, an expected location of the respective installed physical asset of interest and corresponding asset type associated with the respective installed physical asset of interest. The installed physical asset of interest can be any suitable type of resource such as a pole, wireless access points, etc.

Figure 4:
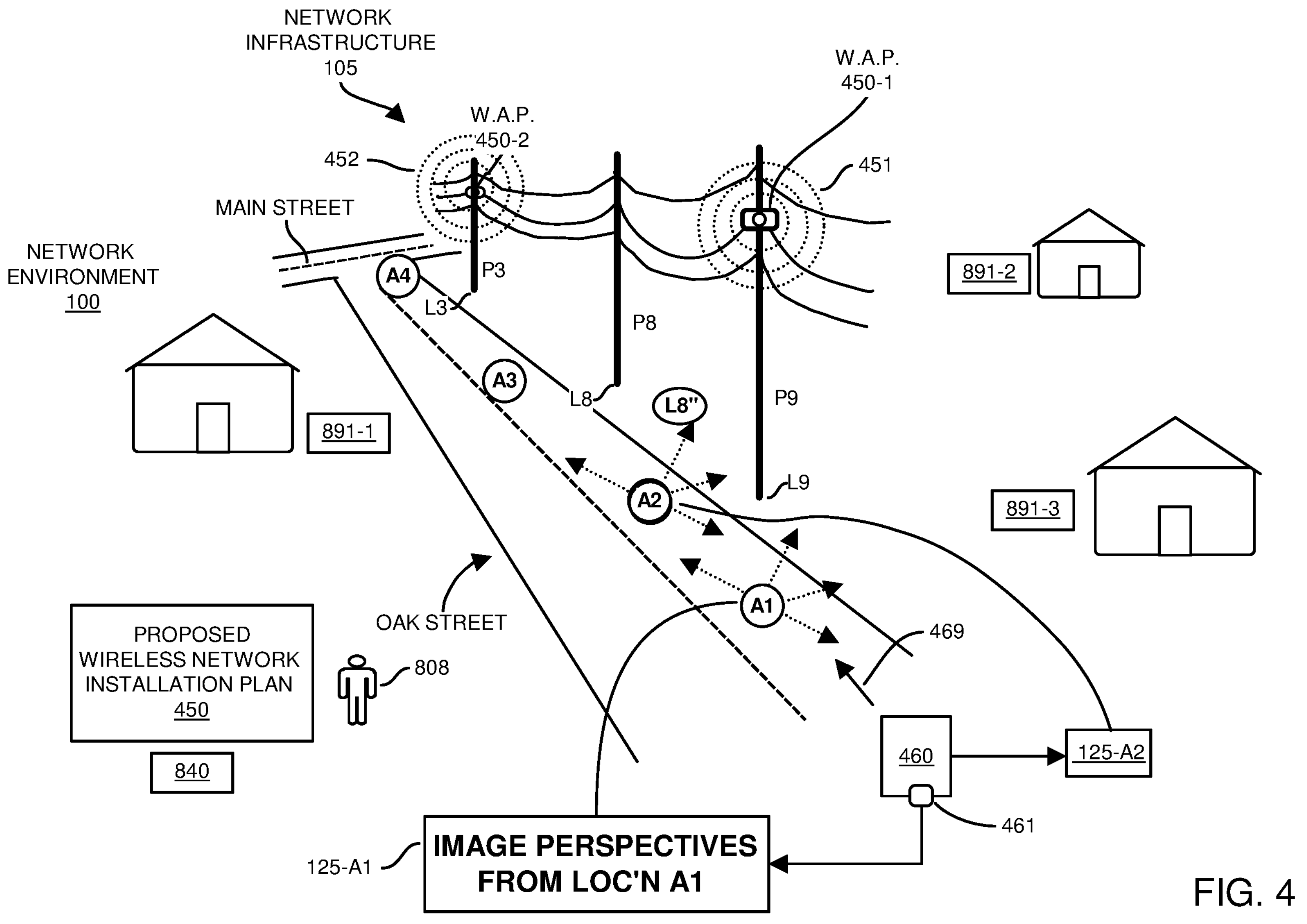
FIG. 4 is an example diagram illustrating how to obtain street view images from multiple different perspectives while at a first location in the network environment as discussed herein.

FIG. 4 is an example diagram illustrating how to obtain images from multiple different perspectives while at a first location in the network environment as discussed herein.

As previously discussed, the network infrastructure map information 120 can be generated based on or can be configured to include one or more different perspectives of images (such as from video or still images) of the different available installed physical assets in the network environment at each of multiple locations.

For example, a vehicle 460 (or other suitable entity) traveling in the right lane of Oak street along direction 469 includes a respective image capturing device 461 (such as capturing omnidirectional image perspectives) to obtain images of installed physical assets such as pole P9, pole P8, . . . , aerial wires, wireless access point 450-1, wireless access point 450-2, etc., from different perspectives as the vehicle 460 travels along Oak street. These images are available as image data 125.

In one example, each set of image data for a particular location can include or be stamped with information such as the location of the vehicle 460 at a time of the image capturing device 161 obtaining respective image data from multiple different perspectives.

For example, when the vehicle 460 and corresponding image capturing device 461 are at location A1, the image capturing device 461 produces images (such as image data 125-A1) from multiple different angular perspectives. The image data 125-A1 (such as Street view images obtained while the image capturing device 461 is at location A1) is tagged with a location value of A1 to indicate that the image data 125-A1 was captured by the image capturing device 461 while at location A1.

Additionally, when the vehicle 460 and corresponding image capturing device 461 are at location A2, the image capturing device 461 produces images (such as image data 125-A2) from multiple different angular perspectives. The image data 125-A2 (such as Street view images obtained while the image capturing device 461 is at location A2) is tagged with a location value of A2 to indicate that the image data 125-A2 was captured by the image capturing device 461 while at location A2.

Note that the location A2 may indicate a respective latitude value A2-Lat (such as 42.233222) and longitude A2-Long (such as −71.63479) associated with the location A2.

The generated image data 125-A2 is tagged with location value A2-Lat (such as 42.233222) and longitude A2-Long (such as −71.63479) and is stored as network infrastructure map information 120 assessable by the location analyzer resource 140.

Figure 5:
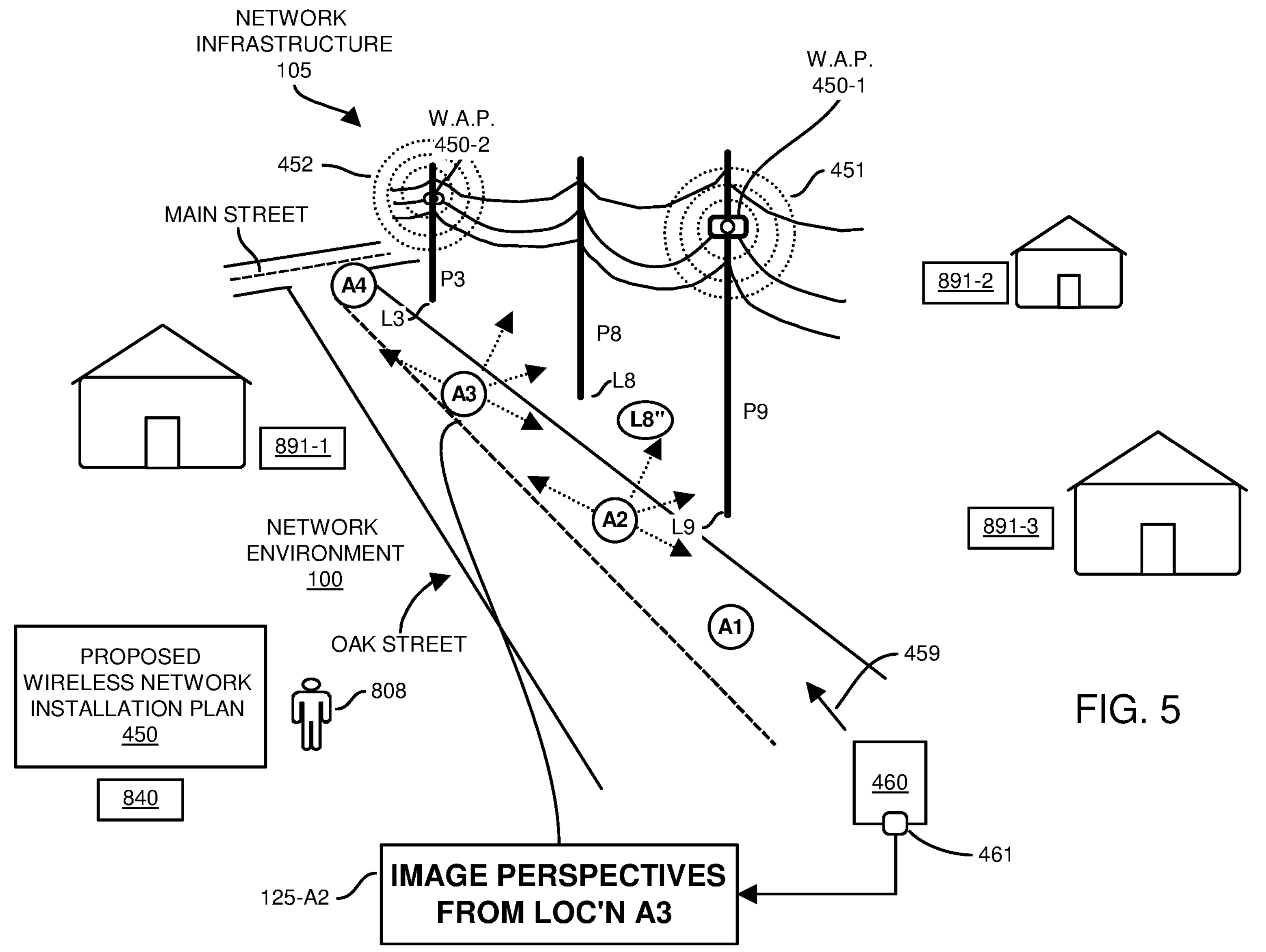
FIG. 5 is an example diagram illustrating how to obtain street view images from multiple different perspectives while at a second location in the network environment as discussed herein.

FIG. 5 is an example diagram illustrating how to obtain images from multiple different perspectives while at a first location in the network environment as discussed herein.

As previously discussed, the vehicle 460 (or other suitable entity) traveling in the right lane of Oak street along direction 469 includes a respective image capturing device 461 to obtain images of installed physical assets such as pole P9, pole P8, . . . , aerial wires, wireless access point 450-1, wireless access point 450-2, etc., from different perspectives as the vehicle 460 travels along Oak street. These Street view images are available as image data 125.

When the vehicle 460 and corresponding image capturing device 461 are at location A3, the image capturing device 461 produces images (such as image data 125-A3) from multiple different perspectives. The image data 125-A3 is tagged with a location value of A3 to indicate that the image data 125-A3 was captured by the image capturing device 461 while at location A3. Note that the location A3 may indicate a respective latitude and longitude associated with the location A3.

Note that the location A3 may indicate a respective latitude value A3-Lat (such as 42.2330504) and longitude A3-Long (such as −71.6348314) associated with the location A2.

The generated image data 125-A3 is tagged with location value A3-Lat (such as 42.2330504) and longitude A3-Long (such as −71.6348314) and is stored as network infrastructure map information 120 assessable by the location analyzer resource 140.

Note that the image data obtained at each of the multiple different locations can be configured to include an image from every possible azimuth angle and 360 degree rotational angle.

In a manner, the device 461 generates image information from multiple different angular perspectives (such as at a center of a sphere viewed outward at all different angles) at each of the different locations.

Locations of the installed physical assets at different locations in the network environment 100 can be determined/derived based on multiple images obtained from one or more different locations of the vehicle 460 and corresponding image capturing device 461 during generation of the images captured from different perspectives.

As shown in FIGS. 4 and 5, the location L8" (such as latitude location value 42.233132 and longitude location value −71.634812) represents an expected location of a respective installed physical asset in the network environment 100 as indicated by the physical asset location information 115. The following FIGS. 6-10 and corresponding description provide details of how the location analyzer resource 140 or other suitable entity verifies and/or derives an actual location value (latitude, longitude, and height) of an installed physical asset in the network environment 100 at or around the location L8" that appears to be the installed physical asset of interest.

Figure 6:
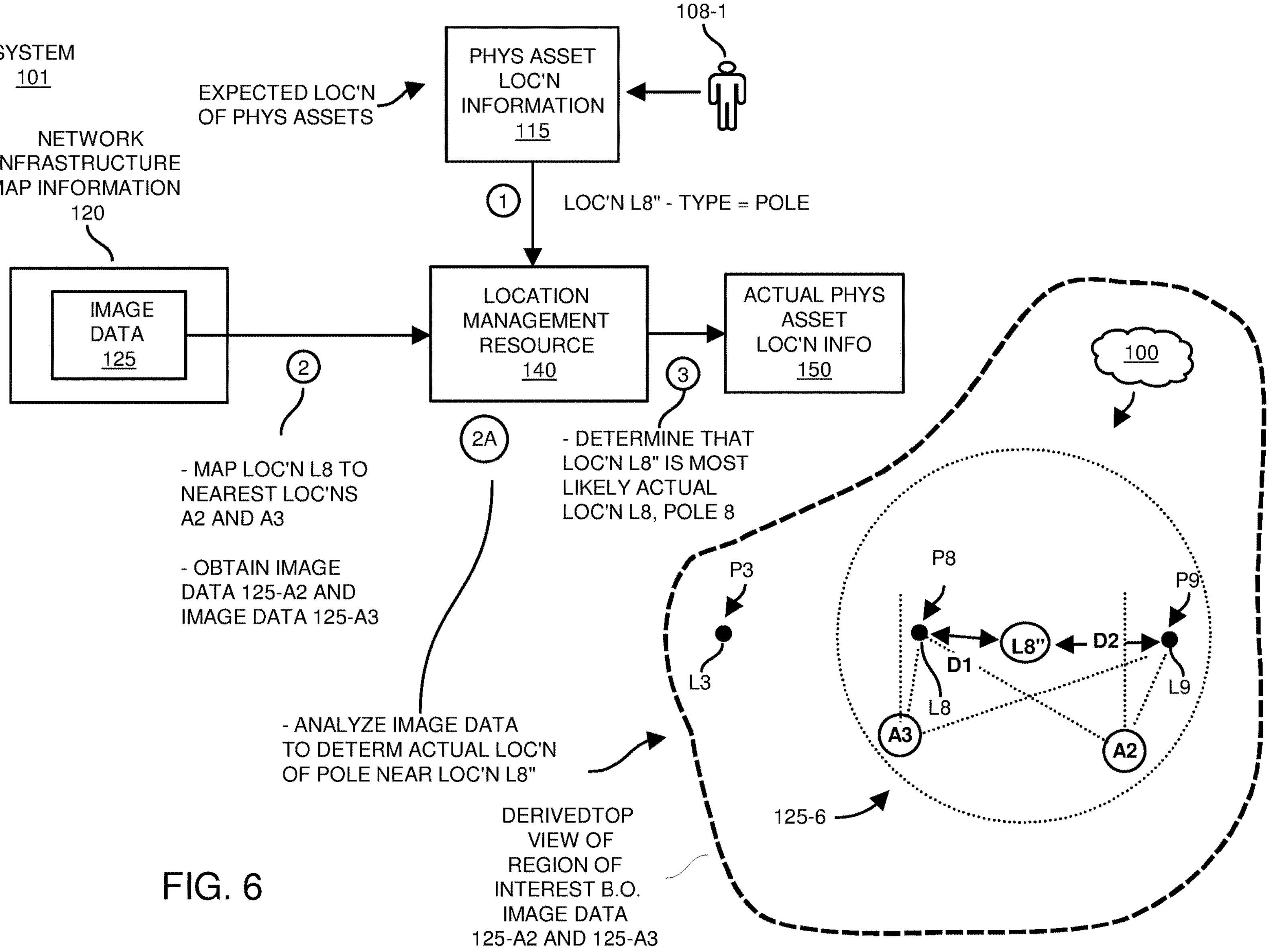
FIG. 6 is an example top view diagram illustrating determination of one or more respective actual location of a corresponding installed physical asset as discussed herein.

FIG. 6 is an example top view diagram illustrating determination of actual locations of one or more installed physical assets of interest based on image analysis interest as discussed herein.

In this example, assume that the personnel 108-1 or other suitable entity produces the physical asset location information 115 to indicate that the expected location of an installed physical asset such as telephone/power line pole is location L8". The physical asset location information 115 can indicate an object type of installed physical asset (such as pole, wire, wireless access point, etc.) for which an actual location is to be determined.

The location analyzer resource 140 receives notification via the physical asset location information 115 that an installed physical asset (such as asset type of interest=pole) in the network environment 100 is expected to be at location L8" (such as location value L8"-Lat (such as 42.233132) and longitude L8"-Long (such as −71.634812).

Based on the location L8", the location analyzer resource 140 retrieves image data 125 including one or more images (top views, side views, perspective views etc.) from network infrastructure map information 120 associated with location L8".

For example, the location analyzer resource 140 determines that locations of image information obtained near location L8" as location A2 and location A3 are pertinent to determining an actual location of the object at location L8". More specifically, as previously discussed, each of the one or more instances of image data 125 stored as network infrastructure map information 120 (capturing images of network infrastructure 105) is tagged with respective location information. The location analyzer resource 140 maps the location L8" to the location A2 and location A3 based on determining that the location A2 and the location A3 are both within a threshold distance of L8" or that locations A2 and A3 are reasonable near location L8".

As discussed herein, the location information A2 and A3 provides a reference from which to derive an actual location of the different installed physical assets in the network environment 100.

For example, via the street view images captured by the image capturing device 461 at location A2 and location A3, the location analyzer resource 140 is able to determine an approximate distance between the image capturing device 461 and the corresponding installed physical assets as captured by the images. The combination of the angle of viewing the installed physical asset of interest in in the images taken at each of the particular locations as well as estimated distance of the installed physical asset of interest with respect to the location A2 or A3 enables the location analyzer resource 140 to determine the accurate location of each of the different installed physical assets such as pole P8, pole P9, etc.

Further in this example, the image data 125-A2 and image data 125-A3 retrieved from the network infrastructure map information 120 include a view of location L8" and corresponding nearby installed physical assets near location L8".

As previously discussed, the retrieved image data 125-A2 includes multiple different perspectives of images associated with the network environment 100 and corresponding installed physical assets nearby the location L8". The image data 125-A2 can be or include top view images, side view images, perspective view images, etc. The location analyzer resource 140 analyzes the retrieved image data 125-A2 and corresponding images of the available physical infrastructure to determine an actual location of the installed physical asset of interest (such as a telephone pole) at expected location L8".

Further in this example, determination of the actual location of the installed pole as specified associated with location L8" can include the location analyzer resource 140, based on the images associated with image data 125-A2 and 125-A3: detecting that no installed physical asset (pole) resides at the expected location L8" as indicated by the location information 115; identifying an object (such as pole P8, P9, etc.) in the image data 125-A2 and 125-A3 that may be the installed physical asset of interest based on the candidate assets in the images being located within a threshold distance of the expected location L8".

Based on image data 125-A2 and image data 125-A3, the location analyzer resource is able to determine locations of each of the installed physical assets such as pole P8, pole P9, etc. In this example, via analysis of the image data 125-A2 and/or image data 125-A3, the location analyzer resource 140 determines that the object (pole P8 or pole P9 in the top view 125-6) is most likely the installed physical asset (telephone pole) of interest because each of candidate pole P8 and candidate pole P9 reside within a threshold distance of the location L8".

In this example, the location analyzer resource 140 uses the image data 125-A2 and image data 125-A3 to determine that the pole P8 in the corresponding images is located at the actual location L8; the location analyzer resource 140 uses the image data 125-A2 and image data 125-A3 to determine that the pole P9 is located at the location L9.

Note that the location analyzer resource 140 can be configured to analyze the corresponding images and detect presence of the poles in the images based on object recognition. In other words, the location analyzer resource 140 can be configured to identify the shape and/or orientation of the pole and analyzing the images to determine presence of polls in them.

As further discussed below, because there is no telephone pole at location L8", it is known by the location analyzer resource 140 that the location information L8" is incorrect. The location analyzer resource 140 attempts to determine which of the existing installed physical assets was purported to be at location L8". For example, the location analyzer resource 140 sets the actual location of the installed physical asset (such as pole of interest) as specified by the location information 115 as being located at location value L8 or L9 depending upon which of the locations is more likely to be the installed physical asset of interest as specified by the location information 115.

As a more specific example, as previously discussed, the physical asset location information 115 may indicate that a respective location of the installed physical asset (i.e., pole of interest) in the network environment 100 resides at location L8". The location analyzer resource 140 determines that there is no telephone pole of interest that location L8". Also, as previously discussed, the location analyzer resource 140 can be configured to determine candidate objects (such as pole P8 and pole P9) in the image data 125 that appear to be a pole at or near proposed location L8". Via the top view 125-6 and actual locations of pole P8 and pole P9 as derived from the image data 125-A2 and/or image data 125-A3, the location analyzer resource 140 determines that the location of candidate pole P8 at location L8 is a distance D1 from the expected location L8". Further, via the generated top view 125-6, the location analyzer resource 140 determines that the candidate pole P9 at location L9 is a distance D2 from the expected location L8".

The location analyzer resource 140 determines that the distance D1 is less than the distance D2. In such an instance, the location analyzer resource 140 determines/assumes that the installed physical asset of interest (such as telephone pole supposed to be at location L8") is more likely to be pole P8 at location L8 than the pole P9 at location L9 because the distance D1 is less than the distance D2. The location analyzer resource 140 produces the actual physical asset location information 150 to indicate that the installed physical asset of interest is located at location L8.

Note that the location value L8 stored in the actual physical asset location information 150 can be encoded to indicate location and/or height in any suitable manner. For example, the location value L8 can indicate the corresponding latitude, longitude, and height or altitude of the pole P8.

Thus, the location information 115 may initially indicate an approximate location in which an installed physical asset (such as pole of interest or other suitable entity) is located in the network environment 100. The location analyzer resource 140 uses the image data 125 as a basis to determine the actual location L8 of the pole P8 (installed physical asset of interest), which is most likely the installed physical asset as specified by the physical asset location information 115. Accordingly, the location analyzer resource 140 can be configured to verify a respective location of an installed physical asset as specified by the physical asset location information 115 prior to installing a new wireless access point in the network environment 100 with respect to the installed physical asset of interest.

As further discussed herein, the configuration management resource 141 can be configured to use the determined actual location L8 of the installed physical asset (such as pole P8, which appears to be the installed physical asset of interest) as a reference location in which to install a new wireless access point in the network environment 100. In other words, the configuration management resource 141 can be configured to use the determined actual location of the pole P8 as a basis in which to install a new wireless access point. This can include installing the new wireless access point on the pole P8 itself if a respective simulation shows that installation of the respective new wireless access point will provide appropriate wireless services to one or more subscriber domains or devices in the corresponding network environment. Alternatively, this can include installing the new wireless access point on a wire at a defined distance with respect to the pole P8.

Knowing the actual location of the installed physical assets present in the network environment 100 as discussed herein is useful because it enables the configuration management resource 141 to determine where it is best to install a respective wireless access point based on accurate installed physical asset location information instead of inaccurate installed physical asset location information. Additionally, knowing the actual location of the physical assets ensures that the installation technician installing the new wireless access point installs the new wireless access point at the appropriate location to provide best wireless services.

As previously discussed, the image data 125 at each location A2, A3, etc., can include street view images including a first image and a second image or any suitable number of images. In this example, the first image captures a first angular view of the installed physical asset; the second image obtained from a second angular view of the installed physical asset; and so on. Each of the multiple images includes a different angular view of the available physical infrastructure. The location analyzer resource 141 analyzes images of the available physical infrastructure to determine the actual location of each installed physical asset based on a combination of the first image and the second image at each location of the image capturing device 461 producing the corresponding images. As discussed herein, the image data 125 including street view images from one or more different locations in the network environment 100 enables the location analyzer resource 140 to reconstruct or determine the actual location of the installed physical assets of interest to thereafter use the determined actual location information to select a best location in which to install a respective new one or more wireless access points.

Figure 7:
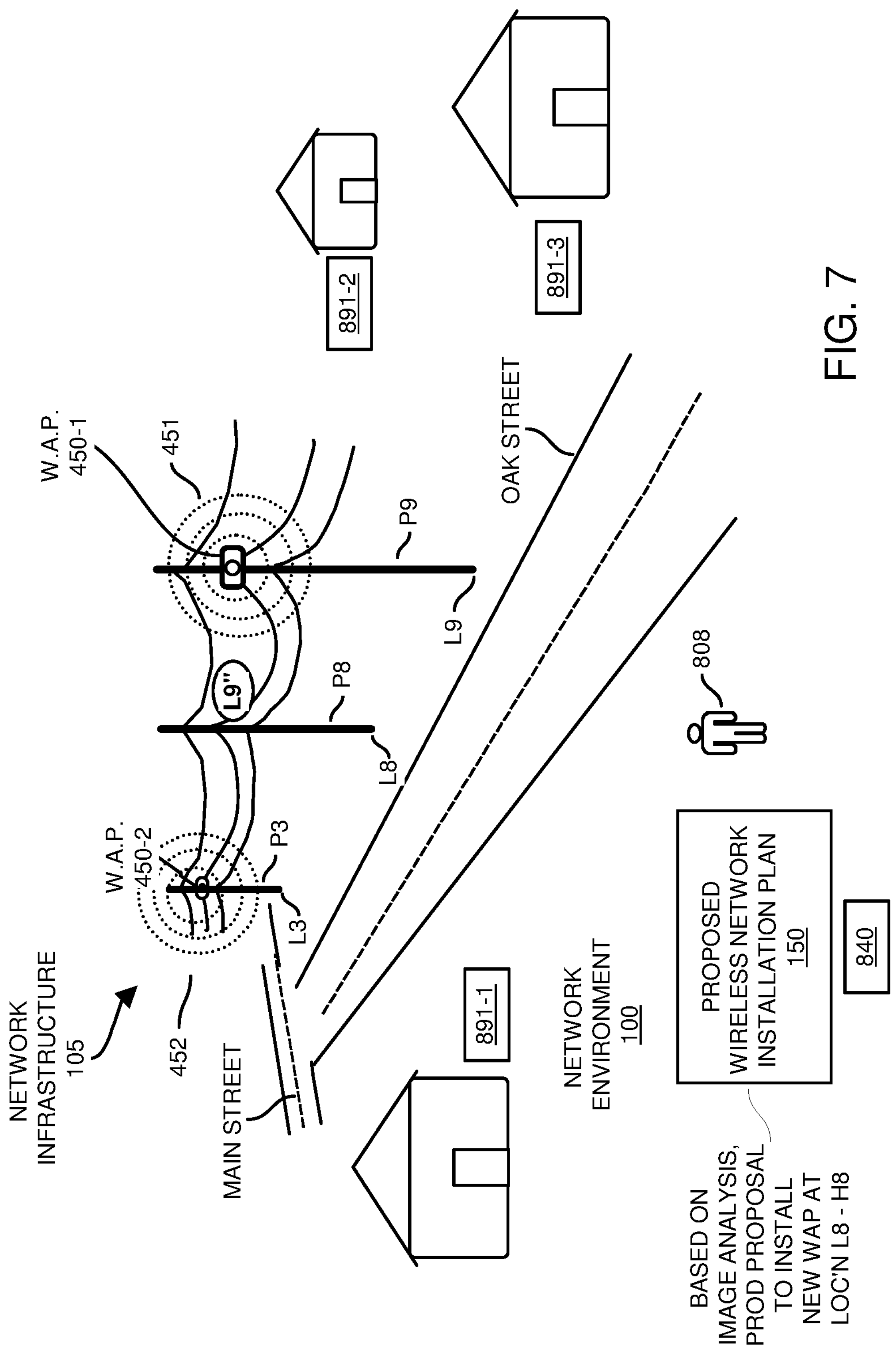
FIG. 7 is an example diagram illustrating an image of a network environment and desired location of installing a new wireless access point as discussed herein.

FIG. 7 is an example diagram illustrating a network environment and installation of wireless access points as described herein.

As previously discussed, the configuration management resource 140 initially uses the network infrastructure map information 120 and corresponding image data 125 at multiple different image collection locations A2 and A3 to determine availability of and corresponding locations of different physical infrastructure in the network environment. In one example, the locations of different installed physical assets are determined based on the geometric analysis of respective image data obtained at each of multiple different locations. The respective image taken at known locations provides a view of the locations of installed physical assets of interest. The locations of the installed physical assets of interest are determined based on the known locations from which the images were obtained. In other words, the use of the know location of the image capturing device at a time of capturing respective images provides a basis in which to determine the actual locations of the different installed physical assets in the network environment 100

Note again that the image data 125 provides additional information about the attributes of the available physical infrastructure. For example, the latitude and longitude locations of the installed physical assets can be determined via the image data as well heights of obstacles, aerial wires, other wireless access points, etc.

Still further, the configuration management resource 141 can be configured to generate proposed wireless network installation plan 150 to include specific information about the number of wireless stations to deployed as well as location and height information associated with installation of each of the new wireless access points. In such an instance, the proposed wireless network installation plan 150 provides guidance to a respective installer installing the wireless access points.

In further example embodiments, as previously discussed, prior to installation of a new wireless network such as at location L9" on or a specified distance with respect to the pole P9 as indicated by the proposed wireless network installation plan 150, the configuration management resource 140 or other suitable entity can be configured to perform a test simulation (such as via simulation verification resource 160 or other suitable entity) to confirm that the proposed wireless network installation plan and installation of a new wireless access point at location L9" provides a desired wireless coverage to subscriber domain 891-2 and corresponding wireless stations therein.

Note that the simulation verification of the proposed wireless network installation of a new wireless access point at location L9" can include performing the simulation based on known locations of the installed physical assets and new wireless access points being installed as well as nearby obstacles (in the corresponding locations) as determined by the image information.

Techniques herein are useful over conventional techniques. For example, implementation of a configuration management resource and corresponding operations as discussed herein provides improved and expeditious implementation of wireless networks to provide wireless connectivity to different users.

Figure 8A:
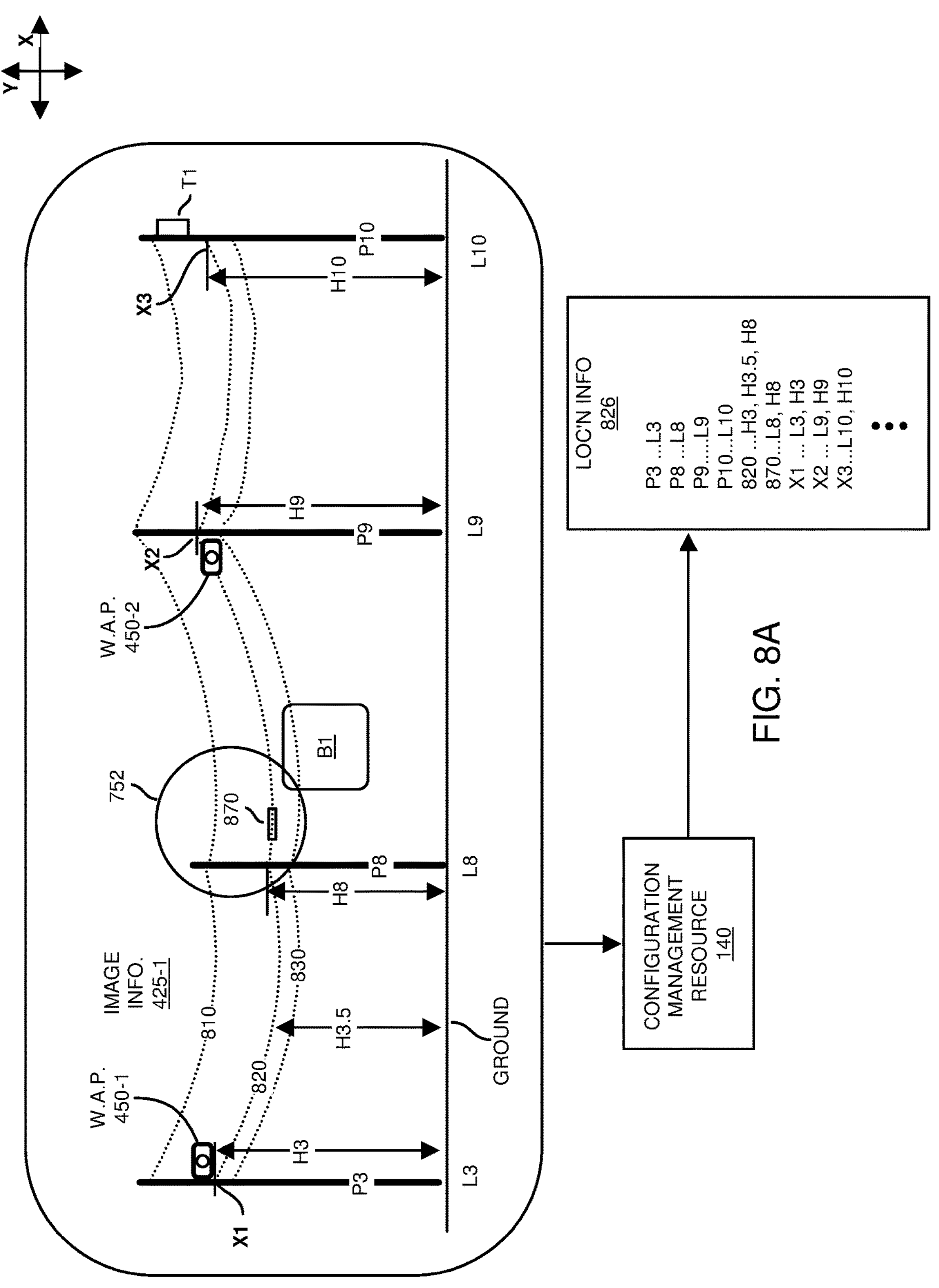
FIG. 8A is an example diagram illustrating image analysis to determine presence and locations of different available installed physical assets for installing one or more new wireless access point as discussed herein.

FIG. 8A is an example diagram illustrating image analysis to determine presence and locations of different available installed physical assets as discussed herein. The determined locations of different types of installed physical assets enables the communication management resource to determine where to install one or more respective new wireless access points with respect to the existing installed physical assets.

As previously discussed, the communication management resource (such as one or more of location analyzer resource 140, configuration management resource 141, etc.) as discussed herein analyzes the respective image data 125 to determine availability of different physical infrastructure in a network environment.

More specifically, via object recognition and analysis of the image data 125 from one or more different angular perspectives as discussed herein, the location analyzer resource 140 determines availability and locations of installed physical assets such as candidate poles P3, P8, P9, P10, etc., corresponding aerial strands 810, 820, 830, etc., in which to potentially install one or more wireless base station to provide wireless coverage to the geographical region (such as selected region or area including geographical regions 212-3, 212-4, 213-2, 213-3, 213-4, 214-2, 214-3, and 214-4).

Via object recognition, the location analyzer resource also can be configured to determine locations of other objects such as building B1, transformer T1, wireless access point 450-1, wireless access point 450-2, and so on.

In one embodiment, the physical asset location information 115 does not indicate height information or side view information associated with the available physical infrastructure in the selected wireless region. The height of installing respective wireless base stations (a.k.a., wireless access points) is useful to know because, typically, a wireless base station implemented at a higher height provides better wireless coverage, thus reducing overall number of wireless base stations that need to be implemented in a particular proposed wireless network to provide desired wireless coverage.

To determine attributes such as location and height information associated with the available physical infrastructure in the region of interest as specified by the physical asset location information 115, the location analyzer resource 140 analyzes multiple different angles of the images (125) capturing the region of interest. Based on the analysis, the location analyzer resource 140 determines locations of each of the available resources such as telephone poles P3, P8, P9, P10, etc., wireless access point 450-1, wireless access point 450-2, object 870, transformer T1, etc., to actual locations in the network environment 100. It is typically desirable to select locations in which to install one or more new wireless access points in the network environment based on locations of potentially interfering components such as building B1, transformer T1, etc.

Thus, the one or more management resources as discussed herein can be configured to determine a type associated with a respective installed physical asset via analysis of the images.

In accordance with further examples, via analysis of the images, the one or more management resources as discussed herein: i) detect presence of a first aerial strand and a second aerial strand in a vicinity of a location of interest as specified by the location information, and ii) determining a distance between the first aerial strand and the second aerial strand. Via generated plan 150, the configuration management resource 141 proposes installation of a new wireless access point between a first aerial strand (such as strand 820) and the second aerial strand (such as strand 830) in response to detecting that the distance between the first aerial strand and the second aerial strand is sufficiently large or wide to install the new wireless access point.

Figure 8B:
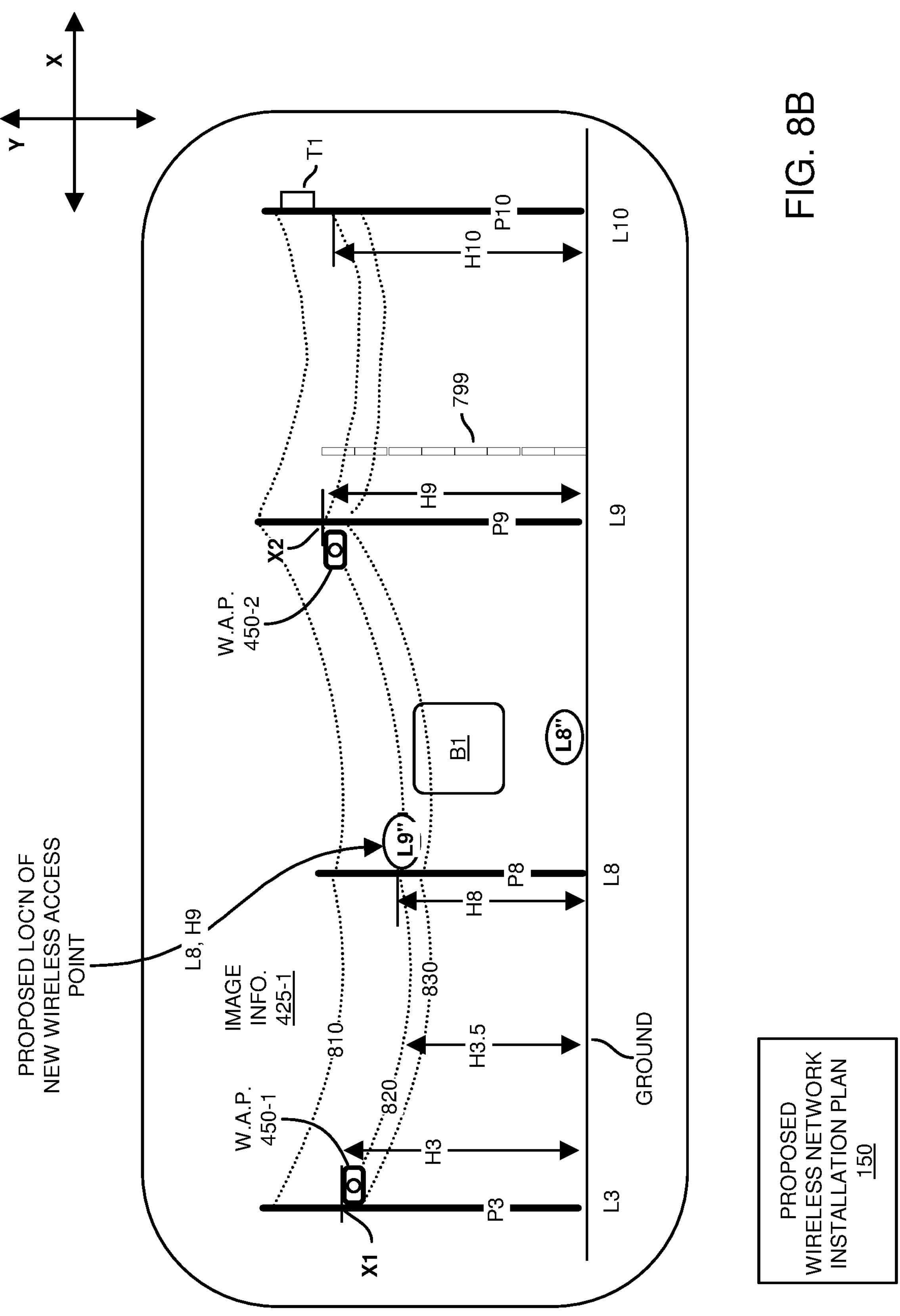
FIG. 8B is an example side view image provided to installation personnel to indicate where to install a new wireless access point in the network environment as discussed herein.

FIG. 8B is an example side view image provided to installation personnel to indicate where to install a new wireless access point in the network environment as discussed herein.

In this example, the location analyzer resource 140 determines that the pole P8 is located at location L8 instead of L8". Based on the accurate location of the pole P8 as being location L8, the communication management resource 141 determines that the best location to provide wireless service to the building B1 is via implementation of a new wireless access point at location L9" (e.g., location L8 at height H8). In such an instance, the communication management resource 141 produces the proposed wireless network installation plan 150 for installing a new wireless access point in the network environment 100 at location L9".

Note that the wireless access point 450-1 and wireless access point 450-2 originally may have been installed at respective locations X 1 and X 2 to provide wireless service to wireless stations in a vicinity of the building B1. However, the quality of wireless service provided by these wireless access points may be very poor. In one example, the new wireless access point installed at location L9" may be a replacement for one or more of the wireless access point 450-1 or wireless access point 450-2. Using the determined actual location information of one or more installed physical assets as discussed herein ensures that installation of the new wireless access point location L9" provides a good wireless service to wireless stations in a vicinity of the building B1 (target location such as a subscriber domain).

In other words, in one example, in response to input indicating that the installed wireless access point 450-1 or wireless access point 450-2 does not provide desired wireless coverage to a subscriber domain and corresponding geographical region such as near or around the building B1 in the network environment 100, the configuration management resource 141 produces a proposed wireless network installation plan 150 for installing a new wireless access point in the network environment 100 at location L9" as a replacement to the installed wireless access point 450-1 or 450-2.

Figure 9:
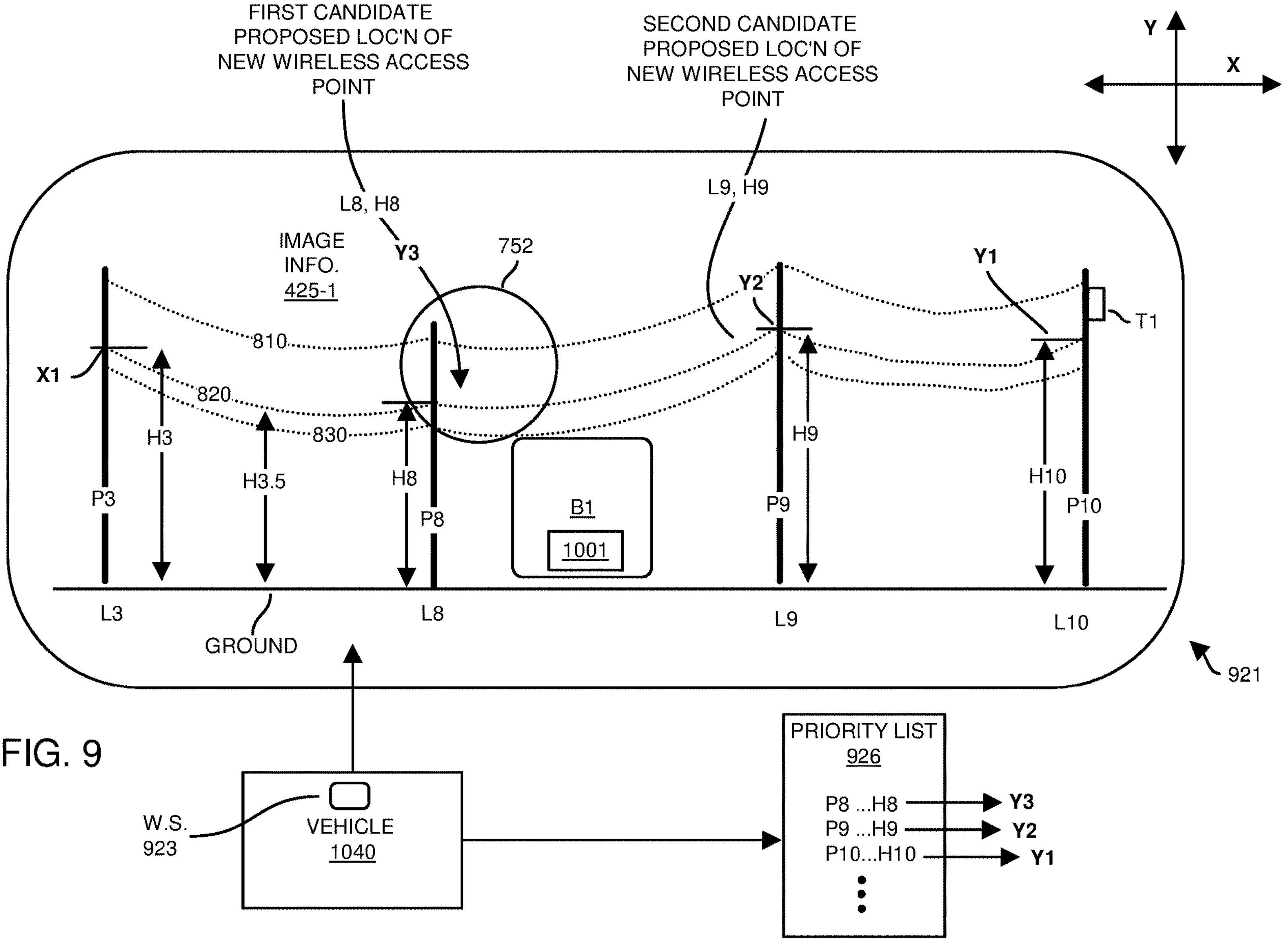
FIG. 9 is an example image diagram illustrating multiple candidate locations in which to potentially install a new wireless access point as discussed herein.

FIG. 9 is an example image diagram illustrating multiple candidate locations in which to potentially install a new wireless access point as discussed herein.

Note that the proposed wireless network plan 150 can be configured to indicate multiple candidate locations in a vicinity of the actual locations of the installed physical assets. The multiple candidate locations in this example include a first candidate location Y1., a second candidate location Y2, a third candidate location Y3, etc.

The configuration management resource 141 can be configured to produce the proposed wireless network installation plan 150 to include a first image 921 as selected from the street view images captured by the image capturing device 161. The image 921 such as derived from one or more of the image data 125-A2, 125-A3, etc., includes a rendition of the installed physical assets as obtained by the image capturing device 461. The image 921 is marked by the configuration management resource 141 to indicate potential one or more locations Y3, Y2, Y1, etc., in which installation personnel is able to select installation of the new wireless access point with respect to the rendition of the installed physical asset. As previously discussed, the actual location in which to potentially install the new wireless access point as captured by the image 921 can be configured to specify attributes such as a height, latitude, and longitude of the installed physical asset in the network environment for each potential location.

Note further that the proposed wireless network plan 150 can be configured to include ranking or priority information 926 ranking the different candidate locations in which to potentially install the new wireless access point. For example, the priority list 926 indicates that the first candidate location P8 at height H8 is likely the best location in which to install the new wireless access point; the priority list 926 indicates that the second candidate location P9 at height H9 is likely the second best location in which to install the new wireless access point; the priority list 926 indicates that the third candidate location P10 at height H10 is likely the third best location in which to install the new wireless access point; and so on.

Note that the candidate locations can be ranked higher or lower in the priority list 926 depending on a density of first mobile communication device users at the first candidate location; a density of second mobile communication device users at the second candidate location; and so on. In other words, it is desirable to install a respective wireless access point where more wireless stations will be provided service.

In accordance with yet further examples, installation of the new wireless access point may include implementing the wireless station 923 to test which of the proposed locations is able to provide best wireless coverage to one or more geographical regions of interest. For example, the wireless station 923 can be disposed in a respective vehicle 1040 or can be a handheld device used by a respective installation technician to test the different proposed locations in which to install the one or more new wireless access points.

As one example, the wireless station 923 can be configured to transmit a first wireless signal from the wireless station 923 (i.e., wireless device) while the wireless station 923 is at or near the first candidate location Y3. Based on one or more communication devices 1001 receiving the transmitted first wireless signal, the wireless station 923 or other suitable entity receives first feedback indicating first performance (such as wireless power level) of the one or more communication devices 1001 in a subscriber domain receiving the first wireless signal.

The wireless station 923 can be configured to transmit a second wireless signal from the wireless station 923 (i.e., wireless device) while the wireless station 923 is at the second candidate location Y2. Based on one or more communication devices 1001 receiving the second transmitted wireless signal, the wireless station 923 or other suitable entity receives second feedback indicating second performance of the one or more communication devices 1001 in a subscriber domain receiving the second wireless signal.

The installation personnel than installs the new wireless access point at the second candidate location Y2 in response to detecting that the second performance is greater than the first performance.

Note further that, prior to installation of a new wireless access point in the network environment, the simulation verification resource 160 can be configured to perform a test simulation to confirm that installation of the new wireless access point at the one or more proposed locations with respect to the actual locations of the installed physical asset provides a desired wireless coverage in a geographical region. As previously discussed, the installation personnel may install the new wireless access point at location Y2 and then initiate transmitting wireless signals from the installed new wireless access point at location Y2 to one or more wireless station 1001 in the geographical region.

Thus, as previously discussed, the system 101 as discussed herein can be configured to verify existence and corresponding location of a respective pole in the network environment 100. Even knowing for certain whether a pole exists or not at the input location is very useful because human surveys are often inaccurate.

Additionally, the system 101 as discussed herein provides a way to search for an installed physical asset of interest and then determine its actual location. Such a function helps to improve verification that input locations are correct and viable. The system 101 as discussed herein provides a way to "crawl" the street the new image looking for poles or other installed physical assets of interest.

Still further, the system 101 as discussed herein supports azimuth viability, reducing Engineering involvement. For example, the system 101 as discussed herein can be extended to review antenna directions (Azimuth) per radio base stations. For already deployed base stations, the system 101 can be configured to account the existing values (system defined) of antenna directions while for planned base stations and review the 360 degree images to determine obstacle distances at every 10 degree difference. Based on the distances, width and degree of obstacles, the system 101 provides the required antenna azimuth at its best capacity. This will help cover maximum traffic without any engineering involvement.

Figure 10:
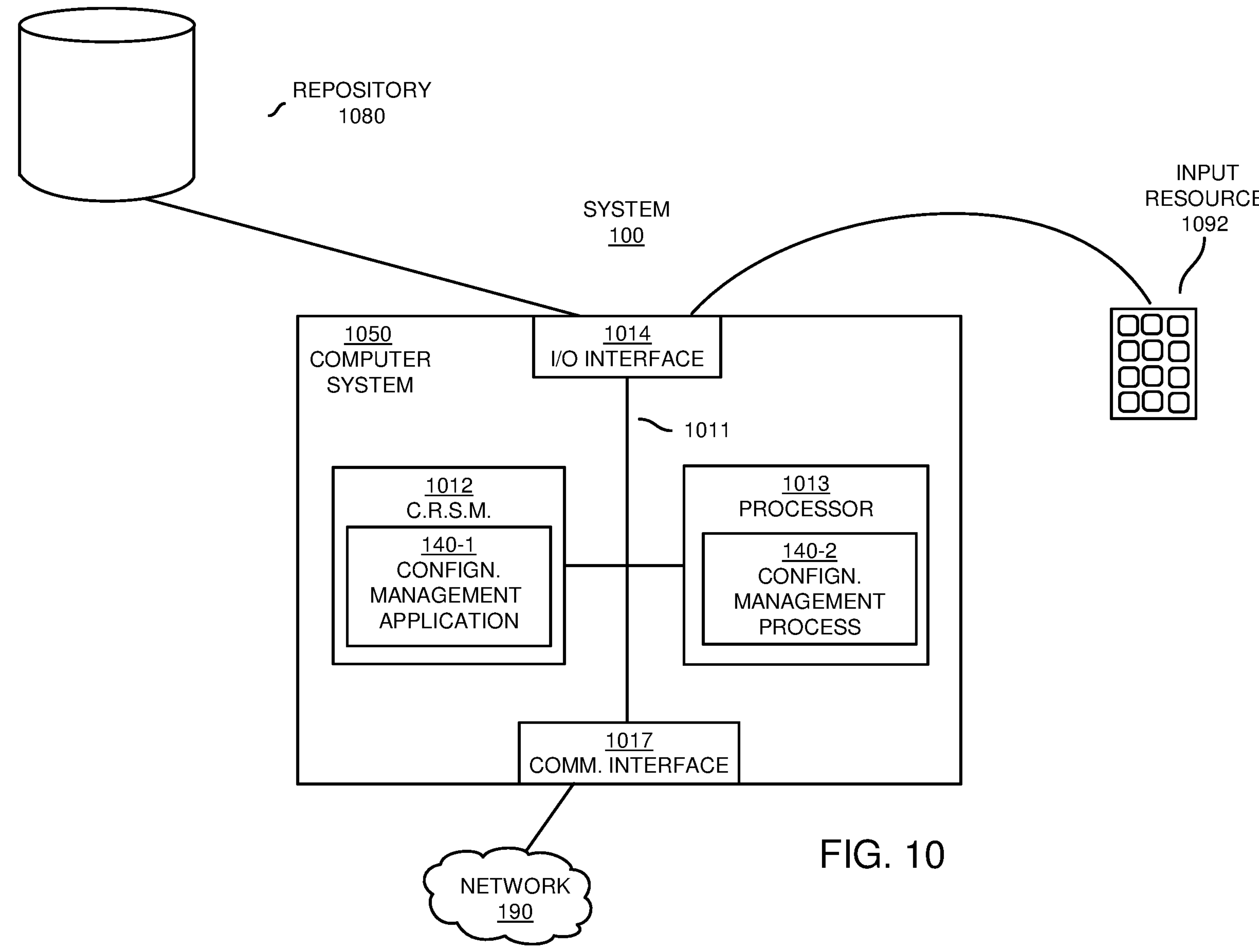
FIG. 10 is an example diagram illustrating example computer hardware and software operable to execute operations as described herein.

FIG. 10 is an example block diagram of a computer system for implementing any of the operations as previously discussed as described herein.

Note that any of the resources (such as location analyzer resource 140, configuration management resource 141, simulation verification resource 160, order system 180, etc.) as discussed herein can be configured to include computer processor hardware and/or corresponding executable instructions to carry out the different operations as discussed herein.

For example, as shown, computer system 1050 of the present example includes interconnect 1011 coupling computer readable storage media 1012 such as a non-transitory type of media (which can be any suitable type of hardware storage medium in which digital information can be stored and or retrieved), a processor 1013 (computer processor hardware), I/O interface 1014, and a communications interface 1017.

I/O interface(s) 1014 supports connectivity to repository 1080 and input resource 1092.

Computer readable storage medium 1012 can be any hardware storage device such as memory, optical storage, hard drive, floppy disk, etc. In one embodiment, the computer readable storage medium 1012 stores instructions and/or data.

As shown, computer readable storage media 1012 can be encoded with management application 140-1 (e.g., including instructions) in a respective wireless station to carry out any of the operations as discussed herein.

During operation of one embodiment, processor 1013 accesses computer readable storage media 1012 via the use of interconnect 1011 in order to launch, run, execute, interpret or otherwise perform the instructions in management application 140-1 stored on computer readable storage medium 1012. Execution of the management application 140-1 produces management process 140-2 to carry out any of the operations and/or processes as discussed herein.

Those skilled in the art will understand that the computer system 1050 can include other processes and/or software and hardware components, such as an operating system that controls allocation and use of hardware resources to execute the management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1050 may reside at any location or can be included in any suitable resource in any network environment to implement functionality as discussed herein.

Functionality supported by the different resources will now be discussed via flowcharts in FIG. 11. Note that the steps in the flowcharts below can be executed in any suitable order.

Figure 11:
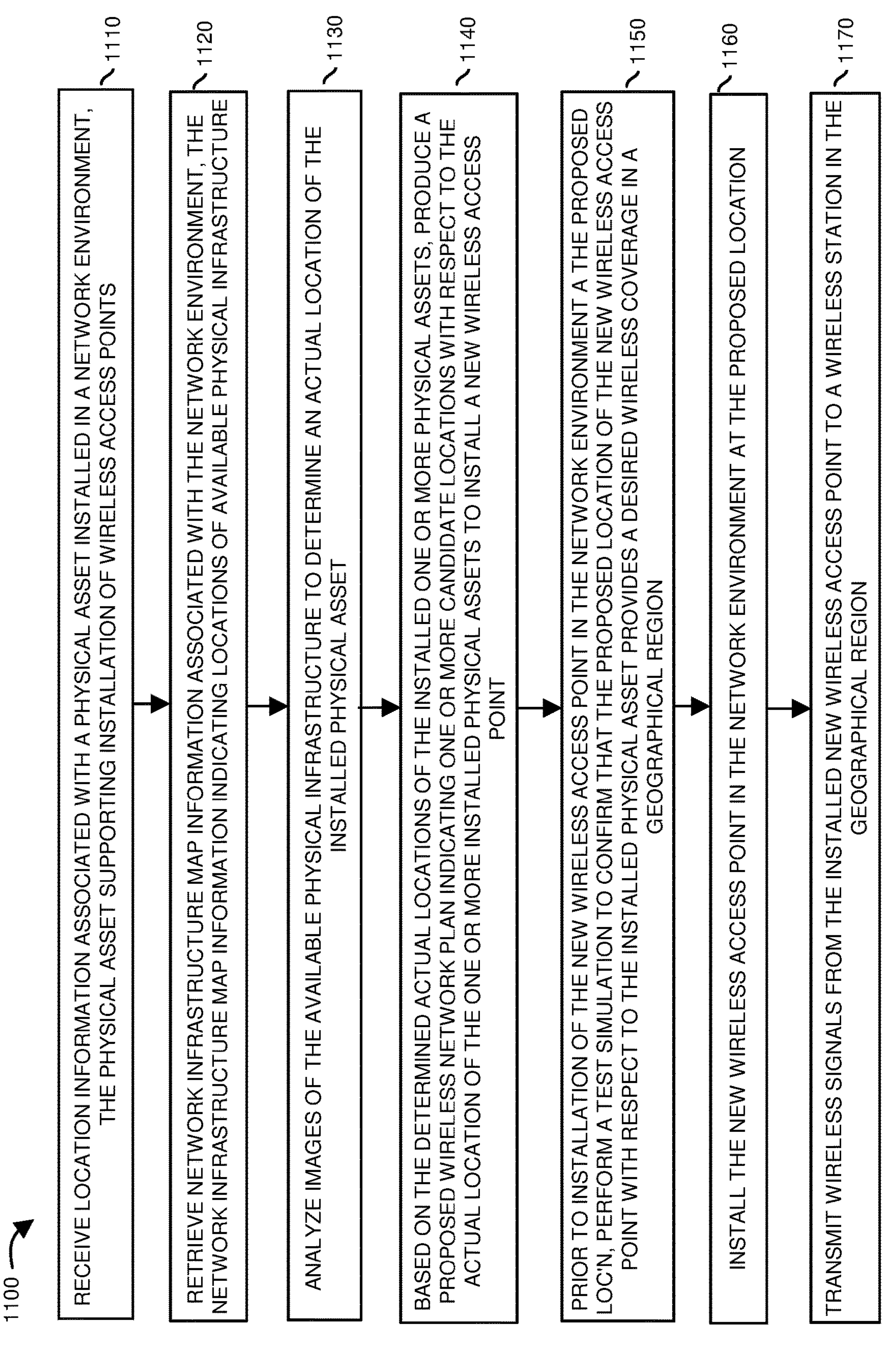
FIG. 11 is an example diagram illustrating a method as described herein.

FIG. 11 is a flowchart 1100 illustrating an example method as described herein. Note that there will be some overlap with respect to concepts as discussed above.

In processing operation 1110, the location analyzer resource 140 receives location information 115 associated with one or more physical assets installed in a network environment 100. The installed physical assets of interest may support installation of a wireless access point or may be a wireless access point itself. An approximate location and/or visual rendition of the installed physical asset of interest may be known and used as a basis to determine a respective actual location of the installed physical asset of interest.

In processing operation 1120, the location analyzer resource 140 retrieve images associated with the network environment 100. The available physical infrastructure as indicated by the retrieved images indicates and/or includes locations of installed physical assets. As previously discussed, the network infrastructure map information 120 can be configured to include image data 125 indicating actual locations of the one or more installed physical assets of interest. The network infrastructure map information 120 also can be configured to include accurate survey information indicating actual locations of one or more installed physical assets of interest. As discussed herein, the network infrastructure map information 120 can be analyzed, via image processing, to determine actual locations of available physical infrastructure (i.e., one or more installed physical assets) in the network environment 100.

In processing operation 1130, via image and pixel processing of the image data, the location analyzer resource 140 analyzes images (such as image data 125 and/or other available information) indicating locations of the available physical infrastructure of interest to determine an actual location of the installed physical assets of interest. As previously discussed, note again that the physical asset location information 115 can be configured to indicate a respective approximate or expected location of the physical asset in the network environment. In accordance with one example, the location analyzer resource 140 analyzes images associated with the installed physical asset of interest as indicated by image data 125 to determine an actual location of the installed physical asset of interest.

In processing operation 1140, based on the determined actual locations of the installed one or more physical assets of interest and a desired region wireless coverage as specified by the wireless coverage information 110, the configuration management resource 141 produces a proposed wireless network plan 160 indicating one or more candidate locations with respect to the actual location of the one or more installed physical assets to install one or more new wireless access points. Note that the proposed wireless network plan 160 can be configured to include images (such as obtained from the image data 125) indicating respective one or more locations in which to install the one or more new wireless access points in the network environment 100.

In processing operation 1150, prior to installation of a new wireless access point in the network environment, the simulation verification resource 160 can be configured to perform a test simulation of the proposed wireless network plan 160. The test simulation includes confirmation that proposed locations of the one or more new wireless access points with respect to the verified installed physical assets provides a desired wireless coverage in a geographical region.

In processing operation 1160, the personnel 108-2 receives confirmation that the proposed wireless network plan 160 at least appears to be able to provide appropriate wireless coverage to a target geographical region. In such an instance, the personnel 108-2 initiates implementation of the proposed wireless network plan 160 including installation of the new wireless access point in the network environment at one or more specified locations.

In processing operation 1170, the newly installed one or more wireless access points are activated to provide (via reception and transmission of wireless signals in the geographical region) one or more wireless stations in the geographical region access to a remote network such as the Internet.

Note again that techniques herein are well suited to determine actual locations of installed physical assets in a network environment and generation of a proposed wireless network installation plan for implementation of the new wireless network. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:

receiving location information associated with a physical asset installed in a network environment;

retrieving images associated with the network environment, the images indicating locations of available physical infrastructure, wherein the images include a first image and a second image, the first image capturing a first angular view of the installed physical asset, the second image capturing a second angular view of the installed physical asset; and analyzing the images of the available physical infrastructure to determine an actual location of the installed physical asset, the actual location of the installed physical asset determined based on a combination of the first image and the second image.

2. The method as in claim 1, wherein the installed physical asset supports installation of a new wireless access point, the method further comprising:

using the determined actual location of the installed physical asset as a reference in which to install the new wireless access point in the network environment.

3. The method as in claim 1, wherein analyzing the images of the available physical infrastructure to determine the actual location of the installed physical asset includes:

detecting that the installed physical asset does not reside at an expected location as indicated by the location information;

identifying an object in the images residing within a threshold distance of the expected location, the object determined to be the installed physical asset;

producing a location value indicating the location of the object in the images; and setting the actual location of the installed physical asset to the location value.

4. The method as in claim 1, wherein analyzing the images of the available physical infrastructure to determine the actual location of the physical asset includes:

receiving a visual depiction representing a rendition of the installed physical asset in the images;

matching the visual depiction representing the rendition of the installed physical asset to an object in the images of the available physical infrastructure; and determining the actual location of the installed physical asset based on a location of the visual depiction as determined from the images.

5. The method as in claim 1, wherein the location information associated with the installed physical asset indicates an approximate location where the physical asset was installed in the network environment.

6. The method as in claim 1, wherein the installed physical asset is an installed wireless access point.

7. The method as in claim 6 further comprising:

in response to input indicating that the installed wireless access point does not provide desired wireless coverage to a subscriber domain in the network environment, producing a proposed wireless network installation plan for installing a new wireless access point in the network environment as a replacement to the installed wireless access point based on a corresponding target location of the subscriber domain to be serviced by the new wireless access point.

8. The method as in claim 7, wherein the proposed wireless network plan indicates multiple candidate locations in a vicinity of the actual location of the installed wireless access point, the multiple candidate locations including a first candidate location and a second candidate location.

9. The method as in claim 8 further comprising:

transmitting a first wireless signal from a wireless device at the first candidate location;

receiving first feedback indicating first performance of a wireless station in the subscriber domain receiving the first wireless signal;

transmitting a second wireless signal from the wireless device at the second candidate location;

receiving second feedback indicating second performance of the wireless station in the subscriber domain receiving the second wireless signal; and installing the new wireless access point at the second candidate location in response to detecting that the second performance is greater than the first performance.

10. The method as in claim 8 further comprising:

subsequent to transmitting a first wireless signal from the first candidate location, receiving first feedback indicating a first signal quality of a wireless station in the subscriber domain receiving the first wireless signal;

subsequent to transmitting a second wireless signal from the second candidate location, receiving second feedback indicating a second signal quality of the wireless station in the subscriber domain receiving the second wireless signal; and installing the new wireless access point at the second candidate location in response to detecting that the second signal quality is greater than the first signal quality.

11. The method as in claim 1, wherein the actual location of the installed physical asset determined from the images specifies a height, latitude, and longitude of the installed physical asset in the network environment, the method further comprising:

ranking a first candidate location and a second candidate location depending on a density of first mobile communication device users at the first candidate location and a density of second mobile communication device users at the second candidate location.

12. The method as in claim 1, wherein the installed physical asset is a previously installed wireless access point, the method further comprising:

producing a proposed wireless network installation plan for installing a new wireless access point in the network environment as a replacement to the previously installed wireless access point, the proposed wireless network installation plan proposing to install the new wireless access point based at least in part on the actual location of the installed physical asset and a corresponding target location of a subscriber domain to be serviced by the new wireless access point.

13. The method as in claim 1 further comprising:

prior to installation of a new wireless access point in the network environment, performing a test simulation to confirm that a proposed location of the new wireless access point with respect to the actual location of the installed physical asset provides a desired wireless coverage in a geographical region;

installing the new wireless access point at the proposed location in the network environment; and transmitting wireless signals from the installed new wireless access point to a wireless station in the geographical region.

14. The method as in claim 1 further comprising:

producing a proposed wireless network installation plan for installing a new wireless access point in the network environment, the first image marked to indicate a location in which to install the new wireless access point with respect to a rendition of the installed physical asset in the first image.

15. The method as in claim 1 further comprising:

via analysis of the images: i) detecting presence of a first aerial strand and a second aerial strand in a vicinity of a location of interest as specified by the location information, and ii) determining a distance between the first aerial strand and the second aerial strand; and proposing installation of a wireless access point with respect to the first aerial strand and the second aerial strand in response to detecting that the distance between the first aerial strand and the second aerial strand is sufficiently large to install the wireless access point.

16. The method as in claim 1, wherein the first angular view of the installed physical asset as captured by the first image is obtained by an image capturing device while the image capturing device is disposed at a first location in the network environment; and wherein the second angular view of the installed physical asset as captured by the second image is obtained by the image capturing device while the image capturing device is disposed at a second location in the network environment.

17. The method as in claim 16, wherein analyzing the images includes:

estimating a first distance between the first location and a first rendition of the installed physical asset as captured by the first image; and estimating a second distance between the second location and a second rendition of the installed physical asset as captured by the second image.

18. The method as in claim 17, wherein analyzing the images includes:

determining the actual location of the installed physical asset based on a combination of: i) the estimated first distance between the first location and the first rendition of the installed physical asset, and ii) the estimated second distance between the second location and the second rendition of the installed physical asset.

19. The method as in claim 16, wherein analyzing the images includes:

using angles of viewing renditions of the physical asset in the first image and the second image and corresponding estimated distances of the installed physical asset determined from the first image and the second image to determine the actual location of the installed physical asset.

20. The method as in claim 16, wherein analyzing the images includes:

determining the actual location of the installed physical asset based on a combination of: i) a first angle of viewing, from the first location, a first rendition of the installed physical asset in the first image, and ii) a second angle of viewing, from the second location, a second rendition of the installed physical asset in the second image.

21. The method as in claim 1, wherein a proposed wireless network plan indicates multiple candidate locations in a vicinity of the actual location of the installed physical asset, the wireless network plan proposing installation of a wireless access point at one of the multiple candidate locations, the multiple candidate locations including a first candidate location and a second candidate location in which to potentially installed the wireless access point.

22. The method as in claim 21 further comprising:

transmitting a first wireless signal from the first candidate location;

receiving first feedback indicating first signal quality of a wireless station receiving the first wireless signal;

transmitting a second wireless signal from the second candidate location;

receiving second feedback indicating second signal quality of the wireless station receiving the second wireless signal; and installing the new wireless access point at the second candidate location in response to detecting that the second signal quality is greater than the first signal quality.

23. The method as in claim 1, wherein the location information indicates an approximate location of the installed physical asset in the network environment; and wherein the determined actual location of the installed physical asset is different than the approximate location of the installed physical asset.

24. The method as in claim 1, wherein the actual location is a first location, the method further comprising:

using the actual location of the installed physical asset as a reference location to install a wireless access point at a second location in the network environment.

25. A system comprising:

communication management hardware operative to:

receive location information associated with a physical asset installed in a network environment;

retrieve images associated with the network environment, the images indicating locations of available physical infrastructure, wherein the images include a first image and a second image, the first image capturing a first angular view of the installed physical asset, the second image capturing a second angular view of the installed physical asset; and analyze the images of the available physical infrastructure to determine an actual location of the installed physical asset, the actual location of the installed physical asset determined based on a combination of the first image and the second image.

26. The system as in claim 25, wherein the installed physical asset supports installation of a new wireless access point; and wherein the communication management hardware is further operative to:

use the determined actual location of the installed physical asset as a reference in which to install the new wireless access point in the network environment.

27. The system as in claim 15, wherein the communication management hardware is further operative to:

detect that the installed physical asset does not reside at an expected location as indicated by the location information;

identify an object in the images residing within a threshold distance of the expected location, the object determined to be the installed physical asset;

produce a location value indicating the location of the object in the images; and set the actual location of the installed physical asset to the location value.

28. The system as in claim 25, wherein the communication management hardware is further operative to:

receive a visual depiction representing a rendition of the installed physical asset in the images;

match the visual depiction representing the rendition of the installed physical asset to an object in the images of the available physical infrastructure; and determine the actual location of the installed physical asset based on a location of the visual depiction as determined from the images.

29. The system as in claim 25, wherein the location information associated with the installed physical asset indicates an approximate location where the physical asset was installed in the network environment.

30. The system as in claim 25, wherein the installed physical asset is an installed wireless access point.

31. The system as in claim 30, wherein the communication management hardware is further operative to:

in response to input indicating that the installed wireless access point does not provide desired wireless coverage to a subscriber domain in the network environment, producing a proposed wireless network installation plan for installing a new wireless access point in the network environment as a replacement to the installed wireless access point based on a corresponding target location of the subscriber domain to be serviced by the new wireless access point.

32. The system as in claim 31, wherein the proposed wireless network plan indicates multiple candidate locations in a vicinity of the actual location of the installed wireless access point, the multiple candidate locations including a first candidate location and a second candidate location.

33. The system as in claim 32, wherein the communication management hardware is further operative to:

initiate transmission of a first wireless signal from a wireless device at the first candidate location;

receive first feedback indicating first performance of a wireless station in the subscriber domain receiving the first wireless signal;

initiate transmission of a second wireless signal from the wireless device at the second candidate location;

receive second feedback indicating second performance of the wireless station in the subscriber domain receiving the second wireless signal; and install the new wireless access point at the second candidate location in response to detecting that the second performance is greater than the first performance.

34. The system as in claim 15, wherein the actual location of the installed physical asset determined from the images specifies a height, latitude, and longitude of the installed physical asset in the network environment; and wherein the communication management hardware is further operative to: rank a first candidate location and a second candidate location depending on a density of first mobile communication device users at the first candidate location and a density of second mobile communication device users at the second candidate location.

35. Computer-readable storage hardware having instructions stored thereon, the instructions, when carried out by computer processor hardware, cause the computer processor hardware to:

receive location information associated with a physical asset installed in a network environment;

retrieve images associated with the network environment, the images indicating locations of available physical infrastructure, wherein the images include a first image and a second image, the first image capturing a first angular view of the installed physical asset, the second image capturing a second angular view of the installed physical asset; and analyze the images of the available physical infrastructure to determine an actual location of the installed physical asset, the actual location of the installed physical asset determined based on a combination of the first image and the second image.

36. A method comprising:

receiving location information indicating a location in which to provide wireless services in a network environment;

retrieving street view images associated with the network environment, the street view images indicating locations of available physical infrastructure, the street view images including a first street view image and a second street view image, the first street view image capturing a first angular view of the available physical infrastructure, the second street view image capturing a second angular view of the available physical infrastructure;

analyzing the street view images of the available physical infrastructure to determine actual locations of installed physical assets; and producing a proposed wireless network installation plan for installing a new wireless access point in the network environment based on an actual location of a first installed physical asset as determined from the street view images, the actual location of the first installed physical asset determined based on a first rendition of the first installed physical asset as captured by the first street view image and a second rendition of the first installed physical asset as captured by the second street view image.

37. The method as in claim 36 further comprising:

determining a type associated with the first installed physical asset via analysis of the street view images.

* * * * *